United States Patent
Wu et al.

(10) Patent No.: US 10,554,708 B2
(45) Date of Patent: Feb. 4, 2020

(54) POINT-TO-MULTIPOINT BROADCAST ASSISTED VEHICLE-TO-X BROADCAST

(71) Applicant: QUALCOMM Incorporated, San Diego, CA (US)

(72) Inventors: Xinzhou Wu, San Diego, CA (US); Edward Robert Hall, Bristol (GB); James Alan Misener, Pacifica, CA (US); Jun Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 15/080,443

(22) Filed: Mar. 24, 2016

(65) Prior Publication Data
US 2016/0285935 A1 Sep. 29, 2016

Related U.S. Application Data

(60) Provisional application No. 62/139,200, filed on Mar. 27, 2015, provisional application No. 62/139,157, filed on Mar. 27, 2015.

(51) Int. Cl.
*H04L 29/06* (2006.01)
*H04B 1/3822* (2015.01)
(Continued)

(52) U.S. Cl.
CPC ....... *H04L 65/4076* (2013.01); *H04B 1/3822* (2013.01); *H04W 4/90* (2018.02); *H04W 76/40* (2018.02)

(58) Field of Classification Search
CPC .......... H04L 2012/5608; H04W 84/12; H04W 88/08; H04W 4/06; H04W 80/04; H04W 88/06; H04W 84/18; H04W 74/08
(Continued)

(56) References Cited

U.S. PATENT DOCUMENTS 9,704,396 B1 * 7/2017 Owens ................. G08G 1/0965
9,773,281 B1 9/2017 Hanson
(Continued)

FOREIGN PATENT DOCUMENTS

| EP | 2760228 A1 | 7/2014 |
| GB | 2486743 A | 6/2012 |
| WO | 2012126827 A1 | 9/2012 |

OTHER PUBLICATIONS

International Search Report and Written Opinion—PCT/US2016/024337—ISA/EPO—dated Oct. 24, 2016.
(Continued)

*Primary Examiner* — Brenda H Pham
(74) *Attorney, Agent, or Firm* — Arent Fox LLP

(57) ABSTRACT

In some cases, V2X systems may send warning messages. The warning messages may be sent over short distances. The warning messages may be useful over wider distances. Some systems may us MBMS from a V2X proximity broadcast. Electronic communications devices, such as UEs may be unaware of the MBMS. A method, an apparatus, and a computer program product for wireless communication are provided. The apparatus may be an RSU. The RSU receive a V2X message from a UE. The RSU may broadcast information associated with the V2X message. The RSU may send the information associated with the V2X message to a network entity for a point-to-multipoint broadcast. The method, an apparatus, and a computer program product for wireless communication may also use V2X messages that include bootstrapping information to tune to an MBMS broadcast.

9 Claims, 19 Drawing Sheets

(51) Int. Cl.
*H04W 4/90* (2018.01)
*H04W 76/40* (2018.01)

(58) Field of Classification Search
USPC .............. 370/310.2, 312, 328, 338, 349
See application file for complete search history.

(56) References Cited

U.S. PATENT DOCUMENTS

| | | | |
|---|---|---|---|
| 2008/0095134 A1* | 4/2008 | Chen | H04B 7/2606 370/342 |
| 2008/0095163 A1* | 4/2008 | Chen | H04L 45/16 370/392 |
| 2008/0136670 A1* | 6/2008 | Tengler | G08G 1/20 340/905 |
| 2009/0210896 A1* | 8/2009 | Song | H04H 60/72 725/32 |
| 2009/0291703 A1* | 11/2009 | Wang | H04W 4/08 455/518 |
| 2009/0309757 A1 | 12/2009 | Mudalige et al. | |
| 2010/0188265 A1* | 7/2010 | Hill | G08G 1/0112 340/905 |
| 2010/0290378 A1* | 11/2010 | Wu | H04W 52/0216 370/311 |
| 2011/0306353 A1* | 12/2011 | Kim | H04W 48/18 455/452.2 |
| 2012/0135676 A1* | 5/2012 | Wu | G06Q 10/06311 455/3.01 |
| 2014/0354451 A1* | 12/2014 | Tonguz | G08G 1/096716 340/905 |
| 2015/0131657 A1* | 5/2015 | Oyman | H04W 56/00 370/390 |
| 2015/0180922 A1* | 6/2015 | Draznin | H04L 65/4076 370/312 |
| 2015/0296411 A1 | 10/2015 | Meyer et al. | |

OTHER PUBLICATIONS

Partial International Search Report—PCT/US2016/024337—ISA/EPO—dated Jul. 11, 2016.

* cited by examiner

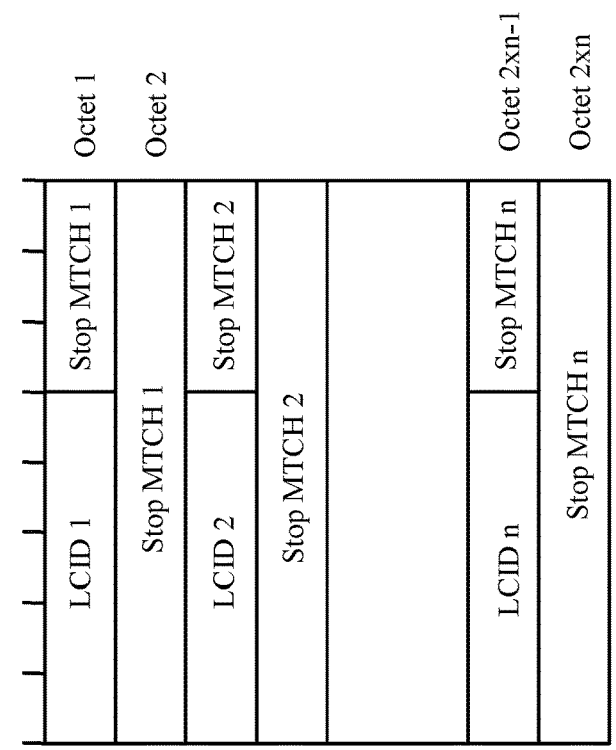
FIG. 4C
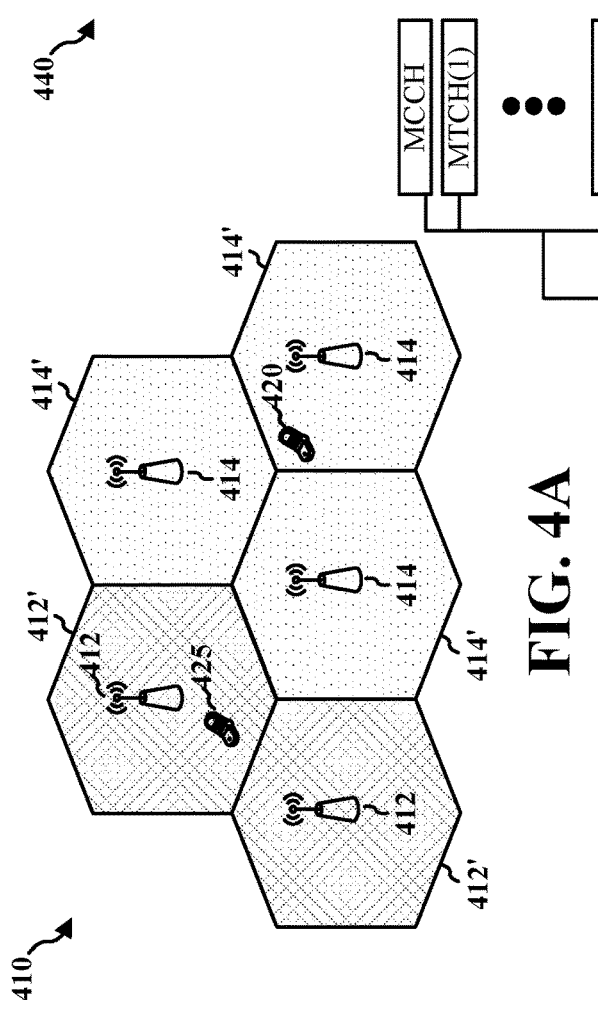
FIG. 4A
FIG. 4B

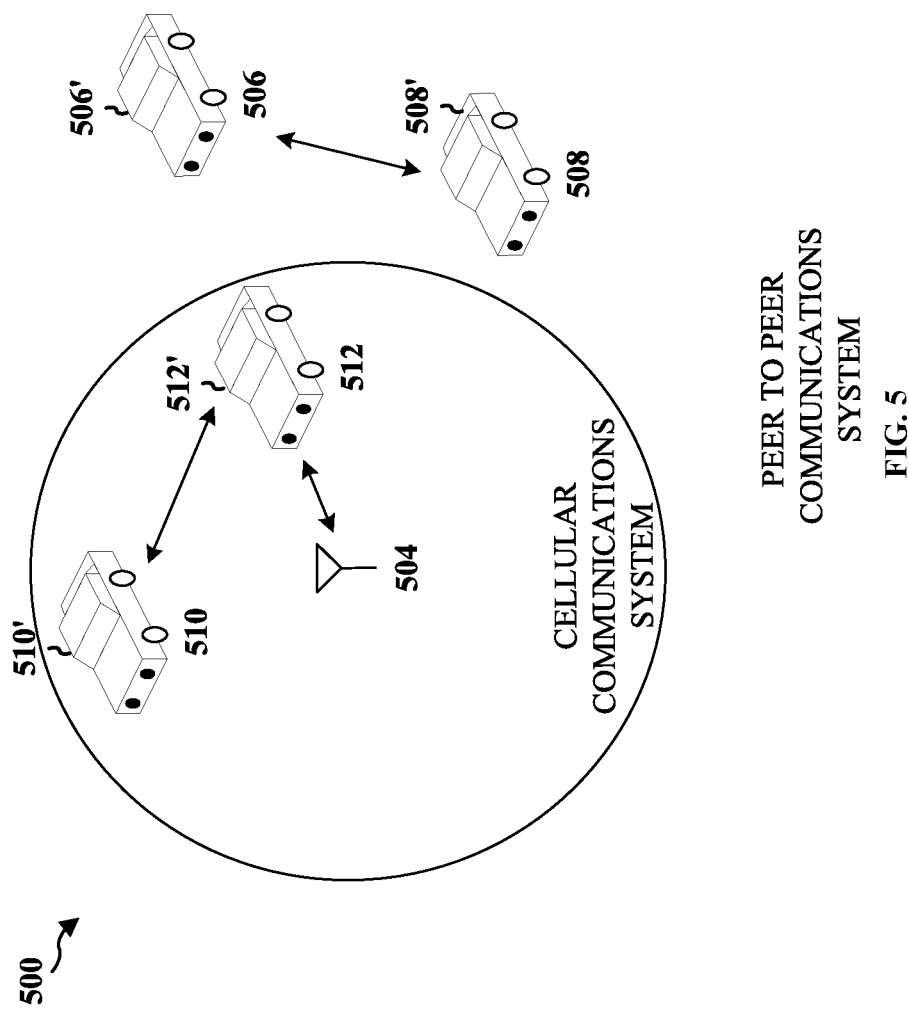

POINT-TO-MULTIPOINT BROADCAST ASSISTED VEHICLE-TO-X BROADCAST

CROSS-REFERENCE TO RELATED APPLICATION(S)

This application claims the benefit of U.S. Provisional Application Ser. No. 62/139,200, entitled "POINT-TO-MULTIPOINT BROADCAST ASSISTED VEHICLE-TO-X BROADCAST" and filed on Mar. 27, 2015 and U.S. Provisional Application Ser. No. 62/139,157, entitled "BOOTSTRAPPING MBMS FROM A V2X PROXIMITY BROADCAST" and filed on Mar. 27, 2015, each of which is expressly incorporated by reference herein in its entirety.

BACKGROUND

Field

The present disclosure relates generally to communication systems, and more particularly, to a communications systems using point-to-multipoint broadcasts and/or vehicle-to-X broadcasts.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Vehicle-to-anything (V2X) technology uses vehicular communication systems to exchange information between vehicles and other entities, to include roadside units. V2X can be used to improve vehicle safety and to eliminate the excessive societal and property damage cost of traffic collisions. In addition, V2X can help in avoiding congestion and finding better routes by processing real-time traffic data. This in turn saves time, improves fuel efficiency, and has significant economic and environmental advantages.

V2X may include two classes of relevant services: V2V (vehicle-to-vehicle) services and V2I (vehicle-to-infrastructure) services. In both services, there are significant safety, mobility and environmental benefits if a car is able to communicate with its surroundings.

In some cases, V2X systems may send warning messages. The warning messages may be sent over short distances, e.g., 200 meters to 300 meters. The warning messages may be useful over wider distances, however. In some cases, systems may use Multimedia Broadcast Multicast Service (MBMS) from a V2X proximity broadcast to transmit a richer set of data through the network entity and therefore enable significant "field to center" communications for road operators and commercial services. This allows for more comprehensive local and regional messages to enhance safety and mobility and environmental stewardship. Additionally, MBMS V2X services can provide data to and from drivers that have commerce value. Electronic communications devices, such as User Equipment (UE) may be unaware of the MBMS transmission and would need bootstrapping to allow tuning to the MBMS transmission.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

As discussed above, in some cases, V2X systems may send warning messages over short distances, e.g., 200 meters to 300 meters. The warning messages may be useful over wider distances, however. Accordingly, some systems and methods described herein may allow for the warnings to be transmitted over a wider area. Furthermore, in some cases, systems may use MBMS from a V2X proximity broadcast. Electronic communications devices, such as a UE may be unaware of the MBMS. Accordingly, some systems and methods described herein may include bootstrapping information in a payload of a V2X message. The bootstrapping information may be used to allow a communication device in a vehicle to tune into an MBMS transmission.

In one aspect of the disclosure, a method, a computer-readable medium, and an apparatus are provided. The apparatus may be a roadside unit (RSU). The RSU receives a V2X message from a UE. In addition, the RSU broadcasts information associated with the V2X message. Additionally, the RSU sends the information associated with the V2X message to a network entity for a point-to-multipoint broadcast.

In another aspect of the disclosure, another method, computer-readable medium, and apparatus are provided. The apparatus may be an RSU. The RSU receives a point-to-multipoint broadcast that includes information from a first V2X message. In addition, the RSU broadcasts the information associated with the first V2X message received in the point-to-multipoint broadcast.

In another aspect of the disclosure, another method, computer-readable medium, and apparatus are provided. The apparatus may be an RSU. The RSU receives information regarding a point-to-multipoint broadcast at the RSU. The information regarding the point-to-multipoint broadcast includes information for tuning to the point-to-multipoint broadcast. The RSU broadcasts a first V2X message including the information regarding the point-to-multipoint broadcast.

In one example, the point-to-multipoint broadcast includes an MBMS broadcast. In one example, the point-to-multipoint broadcast includes a single cell point-to-multipoint (SC-PTM) broadcast.

The RSU may further receive a second V2X message including incident details. In addition, the RSU may further transmit the incident details to a network entity. Additionally, the received information regarding the point-to-multipoint broadcast may be associated with the transmitted incident details.

In one example, the incident details are transmitted to the network entity over a backhaul. In one example, broadcasting the first V2X message is in response to receiving the information regarding the point-to-multipoint broadcast. In one example, the point-to-multipoint broadcast includes the incident details transmitted to the network entity. In one example, the point-to-multipoint broadcast includes an ongoing point-to-multipoint broadcast including multimedia content.

In another aspect of the disclosure, another method, computer-readable medium, and apparatus are provided. The apparatus may be a network entity. The network entity may receive a transmission regarding an incident from an RSU. The network entity may establish a point-to-multipoint broadcast based on the received transmission regarding the incident from the RSU.

In an example the point-to-multipoint broadcast includes an MBMS broadcast. In an example, the point-to-multipoint broadcast includes an SC-PTM broadcast.

The network entity may further transmit information regarding the MBMS broadcast to the RSU. The information regarding the MBMS broadcast may include information for tuning to the MBMS broadcast. In an example, the information regarding the MBMS broadcast may be transmitted to the RSU over a backhaul.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A is a diagram illustrating an example of Multicast Broadcast Single Frequency Network areas in an access network.

FIG. 4B is a diagram illustrating an example of an evolved Multimedia Broadcast Multicast Service channel configuration in a Multicast Broadcast Single Frequency Network.

FIG. 4C is a diagram illustrating a format of a Multicast Channel (MCH) Scheduling Information (MSI) Medium Access Control control element.

FIG. 5 is a diagram illustrating a wireless peer-to-peer communications system in accordance with an example of this disclosure.

DETAILED DESCRIPTION

Figure 1:
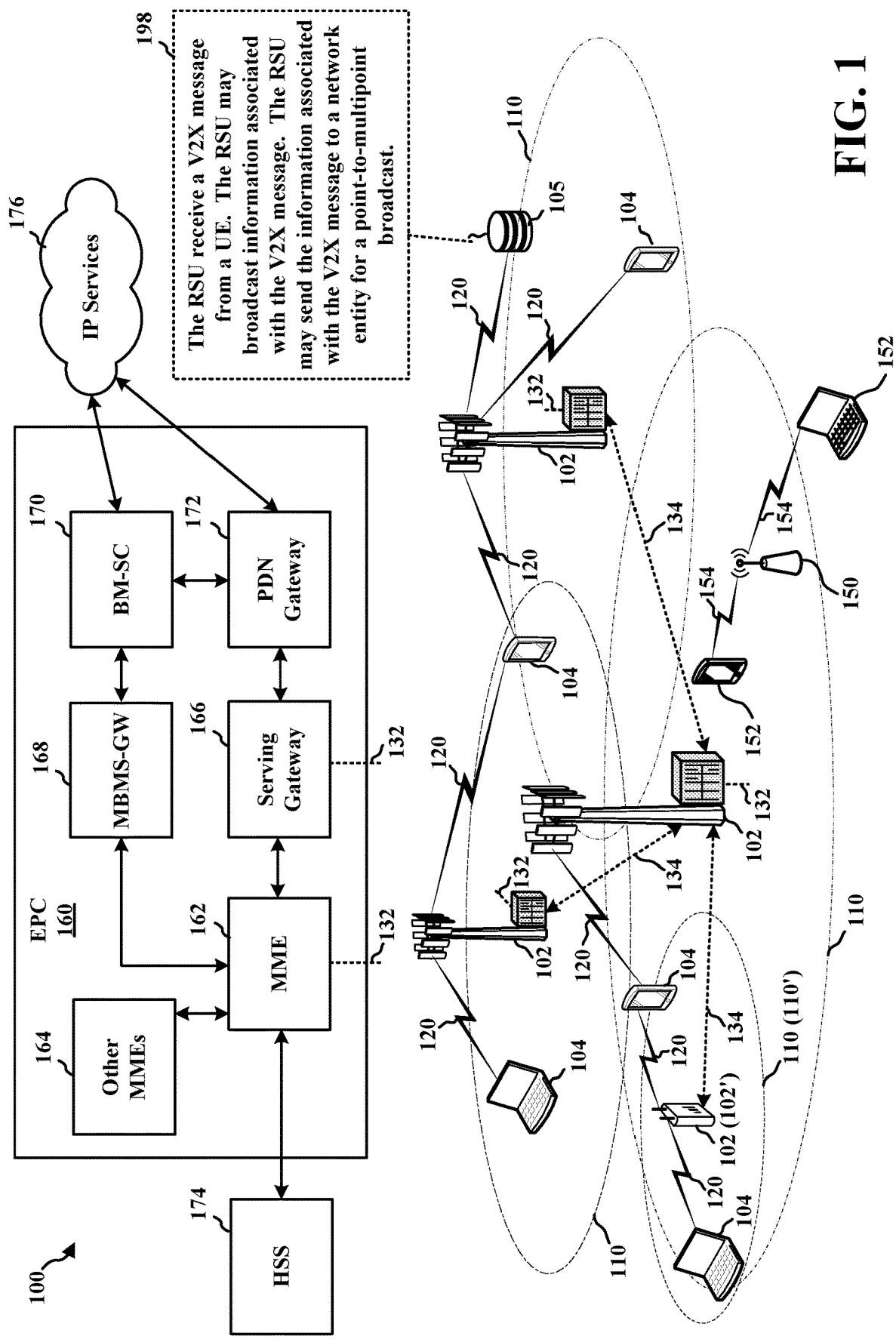
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, MBMS, subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the geographic coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as a forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/Wi-Fi AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, an MBMS Gateway (MBMS-GW) 168, a Broadcast-Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, an RSU 105 may be configured receive a V2X message from a UE. The RSU 105 may broadcast information associated with the V2X message. Additionally, the RSU 105 may send the information associated with the V2X message to a network entity for a point-to-multipoint broadcast.

In another aspect, the RSU 105 receives a point-to-multipoint broadcast including information from a first V2X message. The RSU 105 broadcasts the information associated with the first V2X message received in the point-to-multipoint broadcast.

Figure 2:
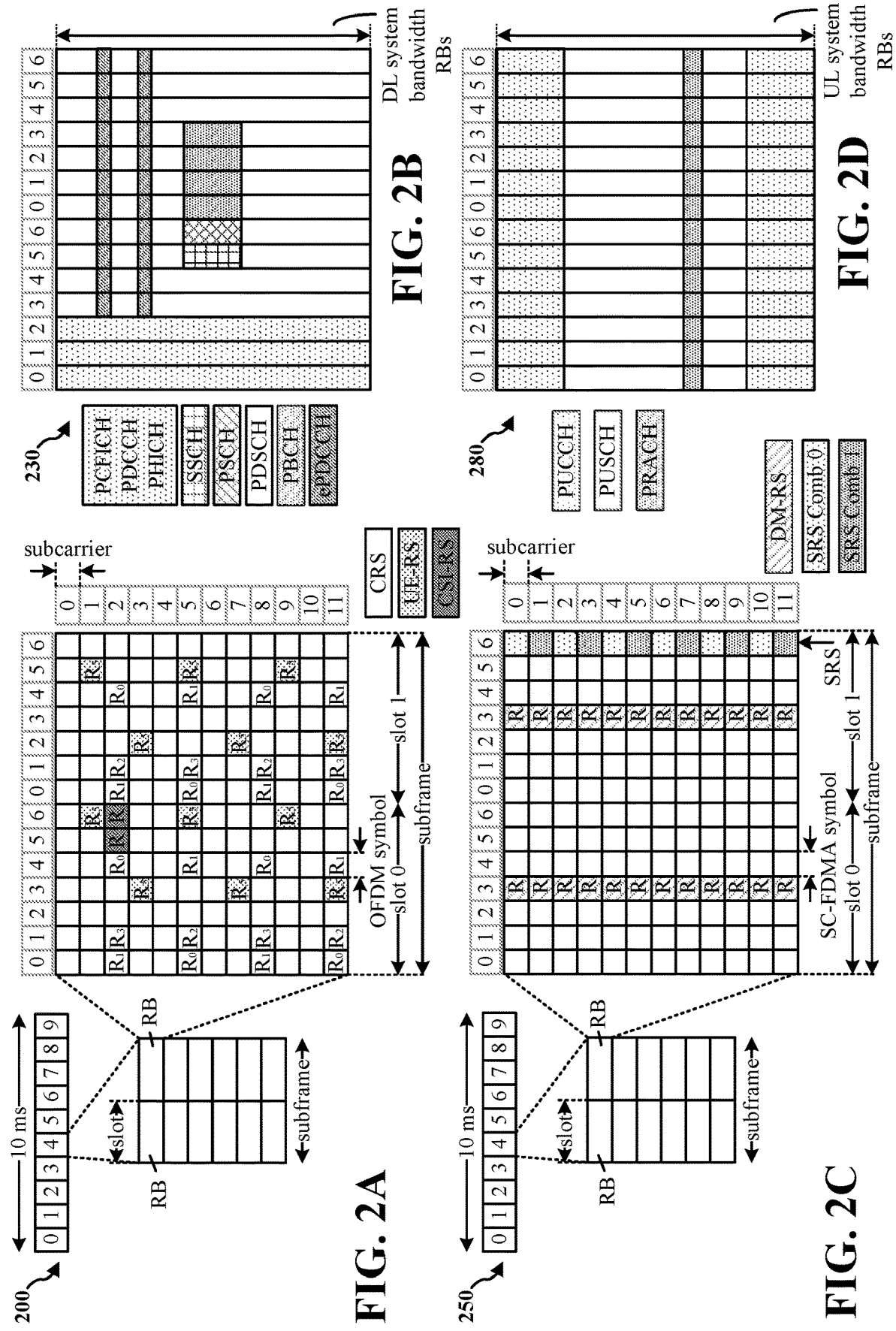
FIGS. 2A, 2B, 2C, and 2D are diagrams illustrating LTE examples of a DL frame structure, DL channels within the DL frame structure, a UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of a UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot may include one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgment (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within a UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
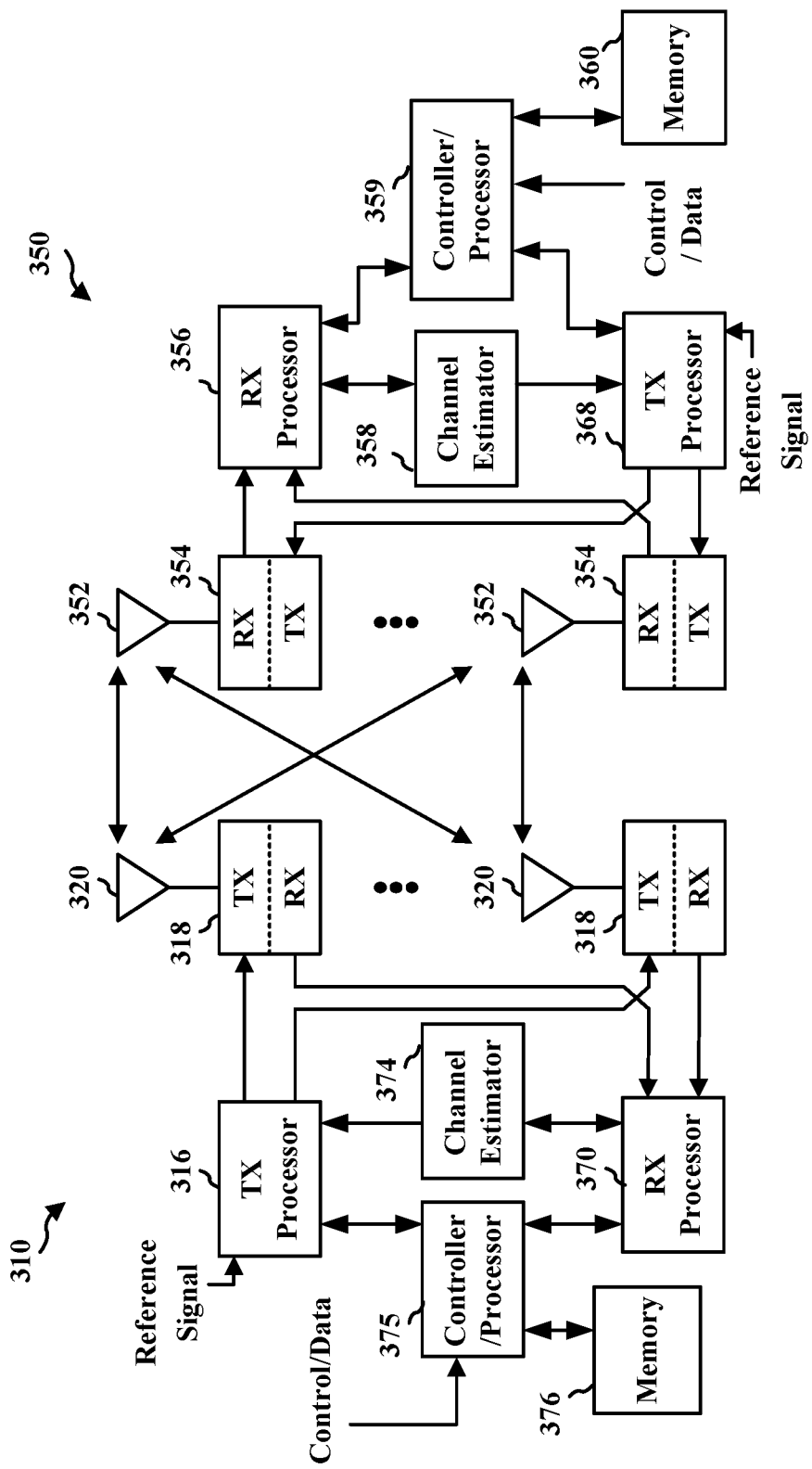
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIG. 4A is a diagram 410 illustrating an example of MBSFN areas in an access network. The eNBs 412 in cells 412' may form a first MBSFN area and the eNBs 414 in cells 414' may form a second MBSFN area. The eNBs 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference with the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs), and the remaining MCHs may multiplex a plurality of MTCHs.

A UE can camp on an LTE cell to discover the availability of eMBMS service access and a corresponding access stratum configuration. Initially, the UE may acquire an SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCID) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCID.

FIG. 5 is a diagram of an exemplary peer-to-peer (or vehicle-to-vehicle) communications system 500. The peer-to-peer communications system 500 includes the vehicles 506', 508', 510', 512' equipped with the wireless devices 506, 508, 510, 512, respectively. The peer-to-peer communications system 500 may overlap with a cellular communications system, such as, for example, a wireless wide area network (WWAN). Some of the wireless devices 506, 508, 510, 512 may communicate together in peer-to-peer communication, some may communicate with the base station 504, and some may do both. For example, as illustrated in FIG. 5, the wireless devices 506, 508 are in peer-to-peer communication and the wireless devices 510, 512 are in peer-to-peer communication. The wireless device 512 is also communicating with the base station 504.

The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

A wireless device may alternatively be referred to by those skilled in the art as UE, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology. The wireless device 510 is within range of the base station 504, but the wireless device 510 is not currently communicating with the base station 504.

The exemplary methods and apparatuses discussed infra are applicable to any of a variety of wireless peer-to-peer communications systems, such as for example, a wireless peer-to-peer communication system based on LTE, V2X, FlashLinQ, VLinQ, WiMedia, Bluetooth, ZigBee, or Wi-Fi based on the IEEE 802.11 standard. To simplify the discussion, the exemplary methods and apparatus may be discussed within the context of V2X. However, one of ordinary skill in the art would understand that the exemplary methods and apparatuses are applicable more generally to a variety of other wireless peer-to-peer communication systems.

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 6:
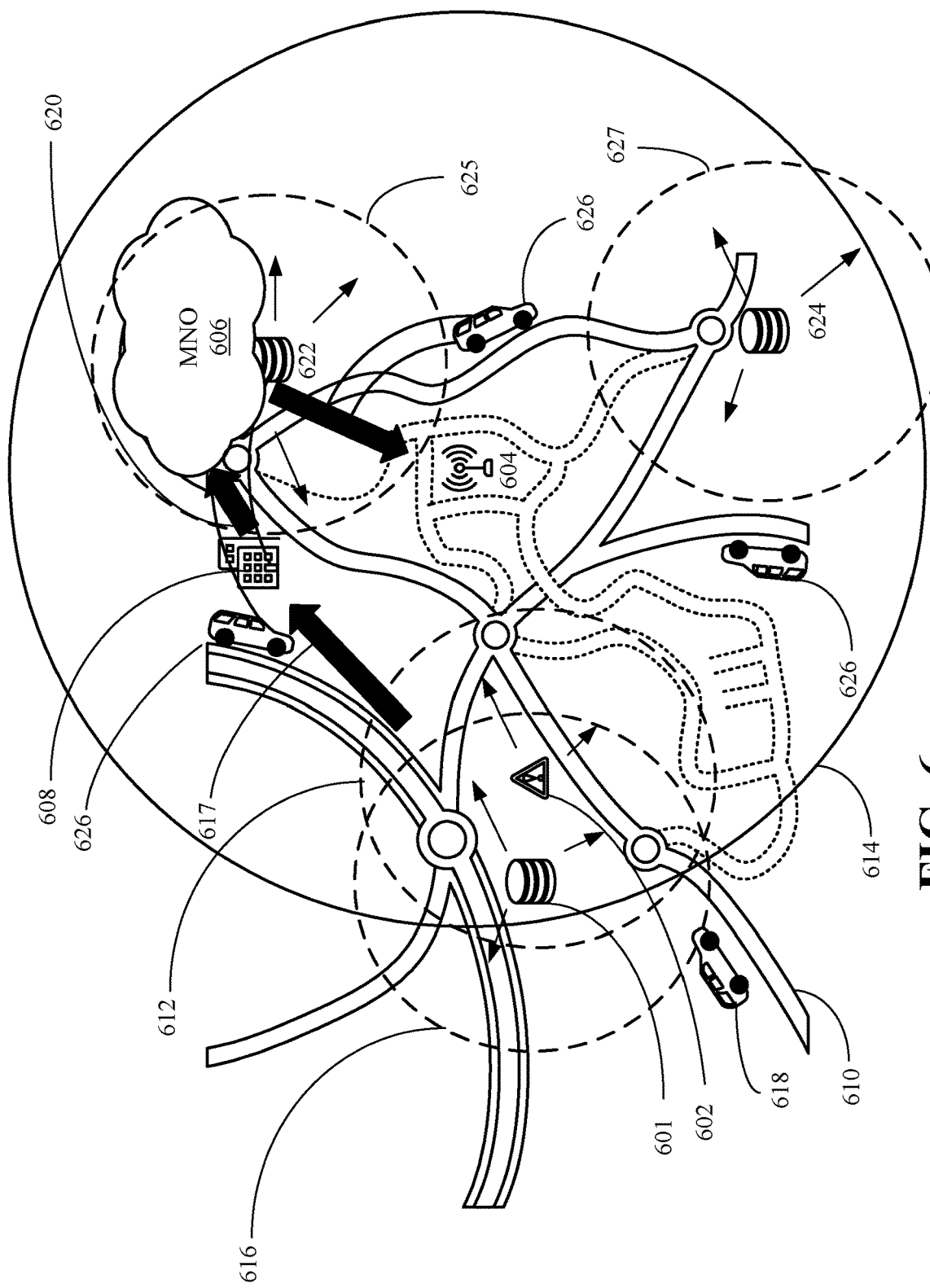
FIG. 6 is a diagram that illustrates a geographic area including a number of communication devices in accordance with an example of this disclosure.

FIG. 6 is a diagram 600 that illustrates a geographic area including a number of communication devices. The communication devices include an RSU 601, a V2X enabled vehicle at an incident 602, and a transmitter/receiver 604 coupled to a Mobile Network Operator (MNO) 606. FIG. 6 also illustrates a local traffic agency 608 in communication with the MNO 606. The geographic area illustrated in FIG. 6 includes a series of roads, highways, and streets 610 along which vehicles may travel. The MNO 606 may also be referred to as mobile wireless service provider, wireless carrier, cellular companies, or mobile network carriers. Examples of the MNOs include, but are not limited to providers of wireless communications services that may own or control the elements necessary to sell and deliver wireless communication services to an end user. Examples of the elements that may be necessary to sell and deliver wireless communication services may including radio spectrum allocation, wireless network infrastructure including the transmitter/receiver 604, backhaul infrastructure, billing, customer care, provisioning computer systems and marketing and repair organizations.

As illustrated in FIG. 6, an incident 602 has occurred at a V2X enabled vehicle. For example, the V2X enabled vehicle at the incident 602 may have been in a crash. As another example, the V2X enabled vehicle at the incident 602 may be on a road segment with traffic congestion, or V2X enabled vehicle at the incident 602 may be in a location where some other incident that may be of interest to other drivers has occurred.

In examples related to road-based vehicles, incidents may generally be related to things that may impact the use of a road, such as the traffic crash and traffic congestion as described above. In other examples, other types of incidents may be of interest. For example, if V2X enabled vehicle at the incident 602 is a train, rather than a car or truck, incidents may be related to things that may impact a train. Examples that may impact a train include, but are not limited to, the location of the train, the track the train is on, and the train's direction of travel, as well as if the train has been in a crash. Other information that may be of interest in a train-related example includes, but are not limited to vehicles, people, or animals on the tracks, the condition of connected train cars, and speed of the train, to name a few. In another example, if the vehicle is an airplane, incidents may refer to things that may impact an airplane. Examples of incidents that might impact an airplane include if the plane has been involved in a crash or runway encroachment. Other examples related to an airplane include mechanical failures, airport closures, or other things that may impact the operation of an airplane. It will be understood, however, that the systems and methods described herein are generally applied to road-based vehicles such as cars, pickup trucks, sports utility vehicles, vans, recreational vehicles (RVs), buses, trucks, and other road-based vehicles.

The V2X enabled vehicle involved in the incident 602 may modify its V2X message 612 to include details of the incident. For example, the details of the incident may include location information, crash severity, or any other information related to the incident. The details of the incident may be transmitted using a V2X message 612. For example, a UE in the vehicle (at the incident 602) may transmit a V2X message 612 containing information on the incident including incident location information and information related to the severity of the incident.

The RSU 601 receives broadcasts, such as V2X broadcasts. For example, the RSU 601 may receive a V2X message 612 from the UE in the V2X enabled vehicle at incident 602. The RSU 601 may send information (through a broadcast 616 or through a backhaul connection 617). The information may be associated with the V2X message 612 from V2X enabled vehicle at the incident 602 to a network entity. As illustrated in FIG. 6, the RSU 601 sends information (616/617) associated with the V2X message 612 to a network entity such as a local traffic agency 608.

As illustrated in FIG. 6, the local traffic agency 608 contacts the MNO 606 to establish or to modify a point-to-multipoint broadcast 614. The MNO 606 establishes or modifies a point-to-multipoint broadcast 614. Thus, as described herein, some examples allow a warning typically sent over distances of 200-300 meters to also be made available over the wider range of the point-to-multipoint broadcast 614. This allows a particularly long-range-sensitive warning (e.g., a serious warning) to be distributed over a much wider area.

The point-to-multipoint broadcast 614 may be established or modified to include an alternative route or alternate routes, one or more maps, or other information that may be useful based on the type of incident that has occurred. In some examples, the point-to-multipoint broadcast 614 may be an MBMS broadcast. In other examples, the point-to-multipoint broadcast 614 may be an SC-PTM broadcast.

All RSUs 601, 622, 624 may receive information associated with the incident 602 and may start to broadcast the information associated with the incident 602. For example, the RSU 601 may receive information associated with the incident 602 from the V2X message 612 sent from the vehicle at the incident 602 and/or from the point-to-multipoint broadcast 614. The RSU 601 may then broadcast the information associated with the incident 602 in a V2X message 616. The RSU 622, 624 may receive information associated with the incident 602 from the point-to-multipoint broadcast 614 and then the RSU 622, 624 may broadcast the information associated with the incident 602 in V2X messages 625, 627 respectively.

As illustrated in FIG. 6, the vehicle 618 is approaching the area of the incident 602 near the V2X enabled vehicle. When the vehicle 618 is within range, the vehicle 618 may receive one of the V2X messages 612, 616. As illustrated in FIG. 6, it generally appears that the vehicle 618 would receive the V2X message 616 first (e.g., before the V2X message 612 or the point-to-multipoint broadcast 614). The V2X message 616 may be received by the vehicle 618 when the vehicle 618 is further away from the incident 602 because the vehicle 618 may generally be within range of the V2X message 616 from the RSU 601 before the vehicle 618 is within range of the V2X message 612 or the point-to-multipoint broadcast 614. The vehicle 618 is within range of the V2X message 616 first as the vehicle 618 travels along one of the streets 610. In some examples, the vehicle 618 may receive a transmission directly from the vehicle at the incident 602. For example, the vehicle 618 may continue driving toward the V2X enabled vehicle at the incident 602. Other vehicles 626 in the area may also receive information from the V2X message, either as a V2X message or from the point-to-multipoint broadcast 614.

As illustrated in FIG. 6, information associated with the V2X message 612 may be sent to the network entity, e.g., the local traffic agency 608, over a backhaul connection 617. The backhaul connection 617 may be any appropriate communication network, such as over a terrestrial telephone network, wirelessly, microwave transmissions, satellite, or some combination of these, to name a few examples. The network entity, the local traffic agency 608, may then communicate 620 with the MNO 606 using any appropriate communication network; again, examples include terrestrial telephone networks, wireless, microwave transmissions, satellite, or some combination of these, to name a few examples.

Generally, the V2X message 612 and the V2X message 616 may be the same and may include incident information, such as information about a crash. In some cases, the V2X message 612 and the V2X message 616 may be identical. Accordingly, the transmitter/receiver 604 may refrain from broadcasting information associated with one of the V2X message 612 and the V2X message 616. Generally, the transmitter/receiver 604 may refrain from broadcasting information associated with the V2X message 612 in favor of the V2X message 616. In other cases, the V2X message 612 and the V2X message 616 may include different information. For example, if multiple incidents occur, the V2X message 616 may include information from the V2X message 612 and another V2X message (not shown). A combination of the information from both messages may be used in such a case, or one message may be selected. The selection of V2X messages may be based on distance from the particular incident because generally incidents that are further away might not be of as much interest as incidents that are closer. However, if an incident is particularly large, the incident may impact a larger geographic area.

In some examples, the vehicle 618 transmitting the V2X message 616 drives into the reception range of the RSU 601. The RSU 601 receives the V2X message from the vehicle 618 containing an event seen/sensed at the vehicle 618. One or more devices in the vehicle 618 may sense the event. For example, if the event is a crash and the vehicle 618 includes sensors to determine if a crash has occurred, the vehicle 618 through its sensors may sense the event. In some examples, the RSU 601 reports the V2X message via backhaul or Uu interface to a base station (or the local traffic agency 608). The base station may be a wide area network (WAN) base station, which may be broadcasting a list of environment information/events to all vehicles within its coverage via MBMS. WAN base station (or entity at the backend in the cloud) may add the reported event from the vehicle at the incident 602 to the event list, and WAN base station may broadcast the updated event list through MBMS.

Figure 7:
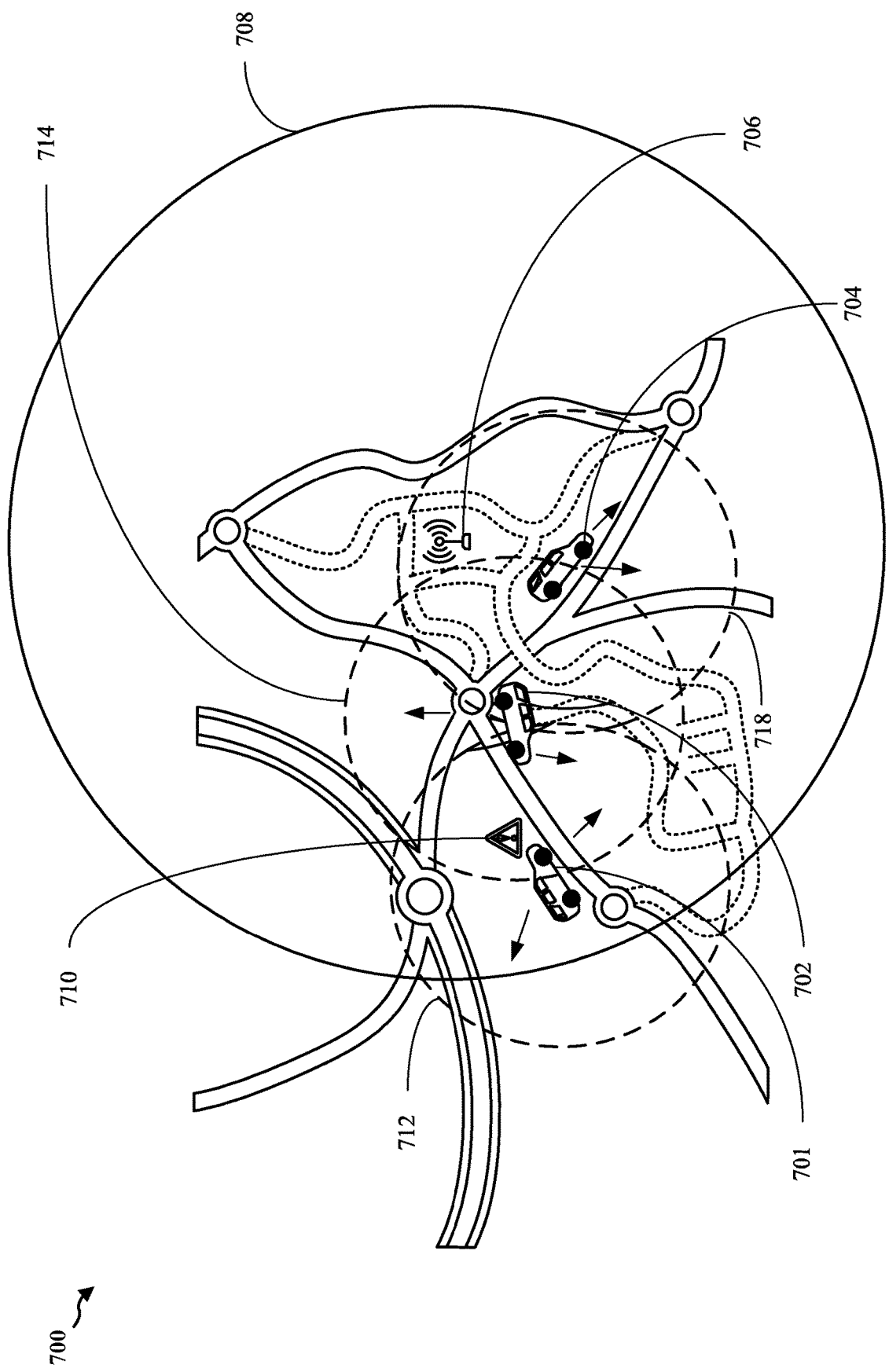
FIG. 7 is a diagram that illustrates the geographic area including another number of communication devices in accordance with an example of this disclosure.

FIG. 7 is a diagram 700 that illustrates the geographic area (of FIG. 6) including another number of communication devices. In the example of FIG. 7, a series of V2X enabled vehicles 701, 702, and 704 may be used to act as a series of relays to forward V2X messages around a broader area than a single vehicle might be able to transmit. It will be understood, however, that vehicular relaying of messages may be dependent on the number of vehicles used, the location of the vehicles, the transmit power of each individual vehicle, the antennas used on each vehicle, geographic features separating the vehicles, and any other factor that may impact the transmission and reception of electromagnetic signals.

FIG. 7 also illustrates a transmitter/receiver 706 for a point-to-multipoint broadcast 708. The transmitter/receiver 706 may receive a message from one or more of the vehicles 701, 702, or 704. Reception of a message from one or more of the vehicles 701, 702, or 704 may be dependent on the same factors that influence reception of transmissions between the vehicles 701, 702, 704, e.g., the location of the vehicles (relative to transmitter/receiver 706), the transmit power of each individual vehicle, the antennas used on each vehicle (and the transmitter/receiver 706), geographic features separating the vehicles, and any other factors that may impact the transmission and reception of electromagnetic signals.

As illustrated in FIG. 7, an incident 710 has occurred. For example, the incident 710 may be a traffic crash or other incident as described herein. The incident 710 may involve another vehicle (not shown) at the location of the incident 710. The vehicle 701 may be near the location of the incident 710 as illustrated in FIG. 7. Accordingly, the vehicle 701 may detect a V2X message related to the incident 710. The vehicle 701 may then modify its local broadcast, e.g., the V2X message 712, to include information related to details of the incident 710. The information may include location, severity, or other details that might be useful depending on the type of incident. The information may be associated with some form of metadata. For example, metadata might be used to set the maximum number of times a relay should occur, for example, n times, where n>1. Metadata might also be used to set the length of time the information should be considered valid, e.g., 10 minutes or other information pertinent to the incident information.

As illustrated in FIG. 7, the vehicle 702 receives the V2X message 712 from the vehicle 701. The vehicle 702 may then modify its V2X broadcast, e.g., the V2X message 714, to include information related to details of the incident 710. The vehicle 704 may receive the V2X message 714 from the vehicle 702. The vehicle 704 may then modify its V2X broadcast, e.g., the V2X message 716 to include information related to details of the incident 710.

A V2X enabled eNB may receive at least one of the vehicular broadcasts at transmitter/receiver 706. For example, as illustrated in FIG. 7, the eNB receives the V2X message 718 (the eNB may be at the transmitter/receiver 706). The eNB may pass the information received in the V2X message 718 to a BM-SC. BM-SC may create a point-to-multipoint broadcast 708 service containing information from one or more of the V2X messages. For example, BM-SC may create an MBMS service containing information from one or more of the V2X messages.

Figure 8:
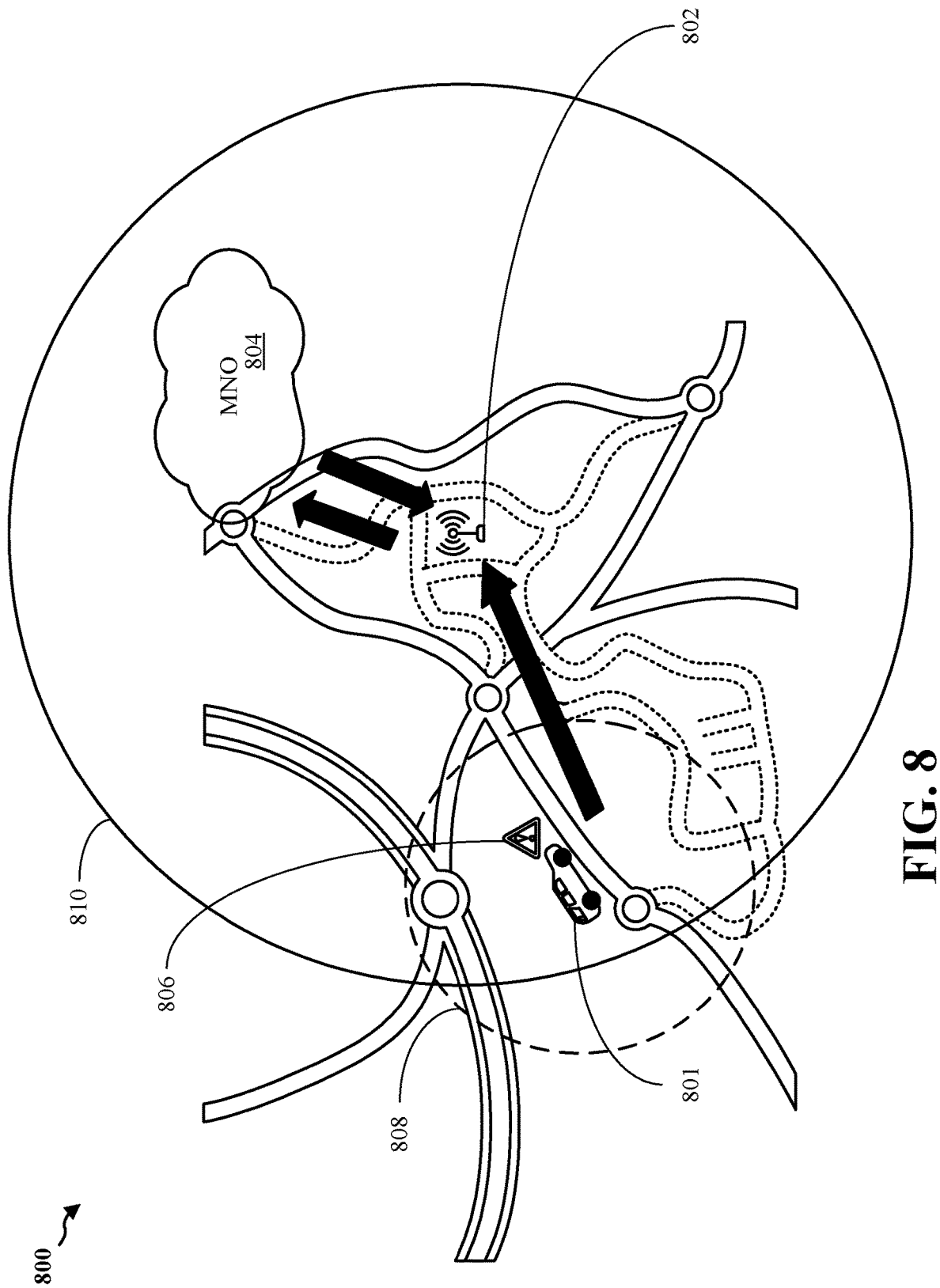
FIG. 8 is a diagram that illustrates the geographic area including yet another number of communication devices in accordance with an example of this disclosure.

FIG. 8 is a diagram 800 that illustrates the geographic area (of FIGS. 6-7) including yet another number of communication devices. The communication devices include a V2X enabled vehicle 801, a transmitter/receiver 802, and MNO 804.

As illustrated in FIG. 8, an incident 806 has occurred. For example, the incident 806 may be a traffic crash or other incident as described herein. The incident 806 may involve a vehicle at the location of incident 806. The vehicle 801 may be near the location of the incident 806 as illustrated in FIG. 8. Accordingly, the vehicle 801 may detect a V2X message related to the incident 806. The vehicle 801 may then modify its local broadcast, e.g., the V2X message 808 (or begin such a broadcast) to include information related to details of the incident 806. Some examples of information related to the details of the incident 806 include, but are not limited to, information such as location, severity, or other details that might be useful depending on the type of incident as described herein. The information may be associated with some form of metadata. For example, as discussed above, metadata might be used to set the maximum number of times a relay should occur, e.g., 10 times. Metadata might also be used to set the length of time the information should be considered valid, e.g., 10 minutes or other information pertinent to the incident information.

In the example of FIG. 8, the vehicle 801 may use a WWAN connection to send a report of the incident 806 to the MNO 804. The MNO 804 may pass the information to the BM-SC, which may create a point-to-multipoint broadcast 810 service containing the information from the V2X message. For example, the BM-SC may create an MBMS service containing information from the V2X message. The transmitter/receiver 802 may provide the point-to-multipoint broadcast 810.

Figure 9:
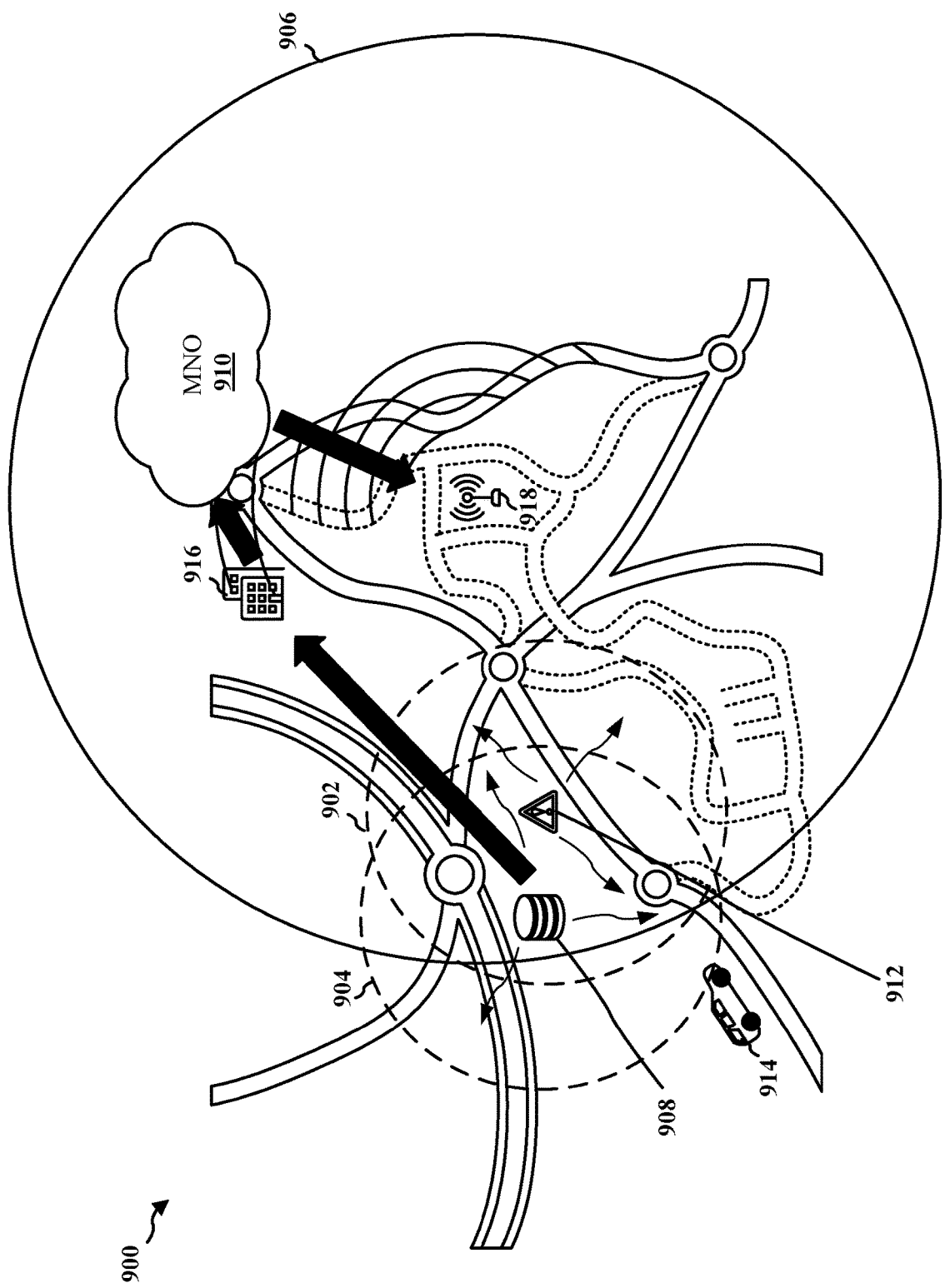
FIG. 9 is a diagram that illustrates a geographic area covered by a communication system in accordance with an example of this disclosure.

FIG. 9 is a diagram 900 illustrating the geographic area (of FIGS. 6-8) covered by a communication system in accordance with an example of this disclosure. The communication signals may include one or more V2X communications 902 and 904 and one or more point-to-multipoint broadcasts 906. FIG. 9 illustrates an example of bootstrapping a point-to-multipoint broadcast 906 from a V2X proximity communication 902, 904.

The V2X communication 902 and 904 may include communication where a vehicle communicates with another vehicle, a vehicle communicates with infrastructure, a vehicle communicates with a pedestrian, infrastructure communicates with a vehicle, and a pedestrian communicates with a vehicle or other communication. The V2X communication 902 and 904 may be via a local broadcast technology like dedicated short range communication (DSRC) or LTE Direct (LTE-D). In some examples, a V2X message may be transmitted via Proximity-based Services (ProSe). Proximity-based services may include services that use location data to determine proximity to a location to control features.

The V2X communication 902 and 904 typically operates in a very low latency (100 ms), low message size (50-300 bytes), short range (300 m) environment and are generally used for safety applications. The V2X communication 902 and 904 may also be used for infotainment, telematics, advertising, mobility management, information gathering, or other uses.

The V2X communication 902 may be a communication broadcast from a vehicle such as an automobile, motorcycle, truck, bus, train, tram, watercraft, aircraft, or another type of vehicle. Generally, however, as described above, vehicles may be roadway based vehicle such as automobile, motorcycle, truck, bus. The V2X broadcast 904 may be a communication broadcast from an RSU 908. The RSU 908 may be a computing device located on the roadside that provides connectivity support for passing vehicles.

The point-to-multipoint broadcasts 906 may be an MBMS broadcast, an SC-PTM broadcast or other types of one-to-many communication connections. The point-to-multipoint broadcasts 906 may originate from transmission equipment 918 belonging to an MNO 910.

The point-to-multipoint broadcasts 906 such as an MBMS broadcast, an SC-PTM broadcast or other types of one-to-many communication connections may be used to enhance V2X by transmitting multimedia content to vehicles via an existing 3GPP network. This content may generally be too large to be transmitted locally to a vehicle via LTE-D, and greater scalability may be gained by using point-to-multipoint broadcasts such as MBMS or SC-PTM.

In one example, an incident 912, such as a traffic crash, traffic congestion, e.g., "traffic jam," a road closure, a weather delay, or another event may occur. In examples related to roadway based vehicles, as described above, incidents may generally be related to things that may impact use of a roadway, such as the traffic crash and traffic congestion described above. In other examples, other types of incidents may be of interest, as described above with respect to trains and airplanes.

A V2X enabled vehicle at the incident 912, and potentially involved in the incident in some cases, may modify (or begin) the V2X enabled vehicle's V2X communication 902 to include details of the incident, such as location of the incident 912, severity of the incident 912, or other details that may be of interest to others regarding the incident 912.

The RSU 908 may receive the V2X communication 902 and may inform the local traffic agency 916 about the incident by forwarding the information in the V2X message to the local traffic agency 916. The local traffic agency 916 may then contact the MNO 910 to establish or to modify the point-to-multipoint broadcast 906 such as an MBMS service. The point-to-multipoint broadcast 906 may include alternate route information, maps, or other information that may be useful for someone trying to avoid an incident such as a traffic accident or traffic congestion.

In some instances, it may be necessary to make a communication device, e.g., in a vehicle 914, aware of the point-to-multipoint broadcast 906. Accordingly, in some examples, a payload of V2X message 904 may include "bootstrapping information" which may be used by the communication device in vehicle 914 to tune into the point-to-multipoint broadcast 906 and thereby receive the content from the point-to-multipoint broadcast 906. In general, bootstrapping information for a point-to-multipoint transmission may include any basic information needed or useful to tune into the point-to-multipoint broadcast, such as frequency, data rate used, or any other data that may be needed or useful to tune into the point-to-multipoint broadcast.

A local RSU, such as the RSU 908 may broadcast a V2X message including information to allow tuning to the point-to-multipoint broadcast 906. In other words, the V2X message may contain a payload of MBMS bootstrapping information.

In an example, an area is covered by a point-to-multipoint broadcast 906. The point-to-multipoint broadcast 906 may enable network broadcasting of a service such as traffic reports or internet streaming radio. The vehicle 914 may drive into the reception range of the RSU 908 transmitting the V2X message 904. The vehicle 914 may include a device implementing various aspects of this disclosure. For example, the device in the vehicle 914 may receive the V2X broadcast 904. The V2X broadcast 904 may include information regarding the point-to-multipoint broadcast 906. The information regarding the point-to-multipoint broadcast 906 may include bootstrapping information and may be part of the payload of the V2X broadcast. The device in vehicle 914 may parse out the information regarding a point-to-multipoint broadcast, e.g., the bootstrapping information, from the payload of the V2X broadcast.

In some examples, the device in the vehicle 914 may functionally include a portion for parsing the information regarding point-to-multipoint broadcast 906 and a portion that uses the information regarding a point-to-multipoint broadcast to tune to the point-to-multipoint broadcast 906 (which may be an MBMS transmission). Accordingly, the information regarding the point-to-multipoint broadcast 906

(e.g., bootstrapping data) may be passed from the portion of the device used for parsing the information to the portion of the device that uses that information to tune to a point-to-multipoint broadcast. In some examples, the portion of the device that uses the information regarding the point-to-multipoint broadcast may be MBMS middleware.

The device in the vehicle 914 may tune to point-to-multipoint broadcast 906 using the information, such as the bootstrapping data. The device in vehicle 914 may download the content from the point-to-multipoint broadcast. This information may be presented to a user, such as the driver of the vehicle, either using user output that is part of the device, by using a user output that is part of vehicle 914, or by using an external user output coupled to the device. A device in vehicle 914 has been used to illustrate one example of the systems and methods described herein. It will be understood, however, that such a device may be used independently from the vehicle 914.

Figure 10:
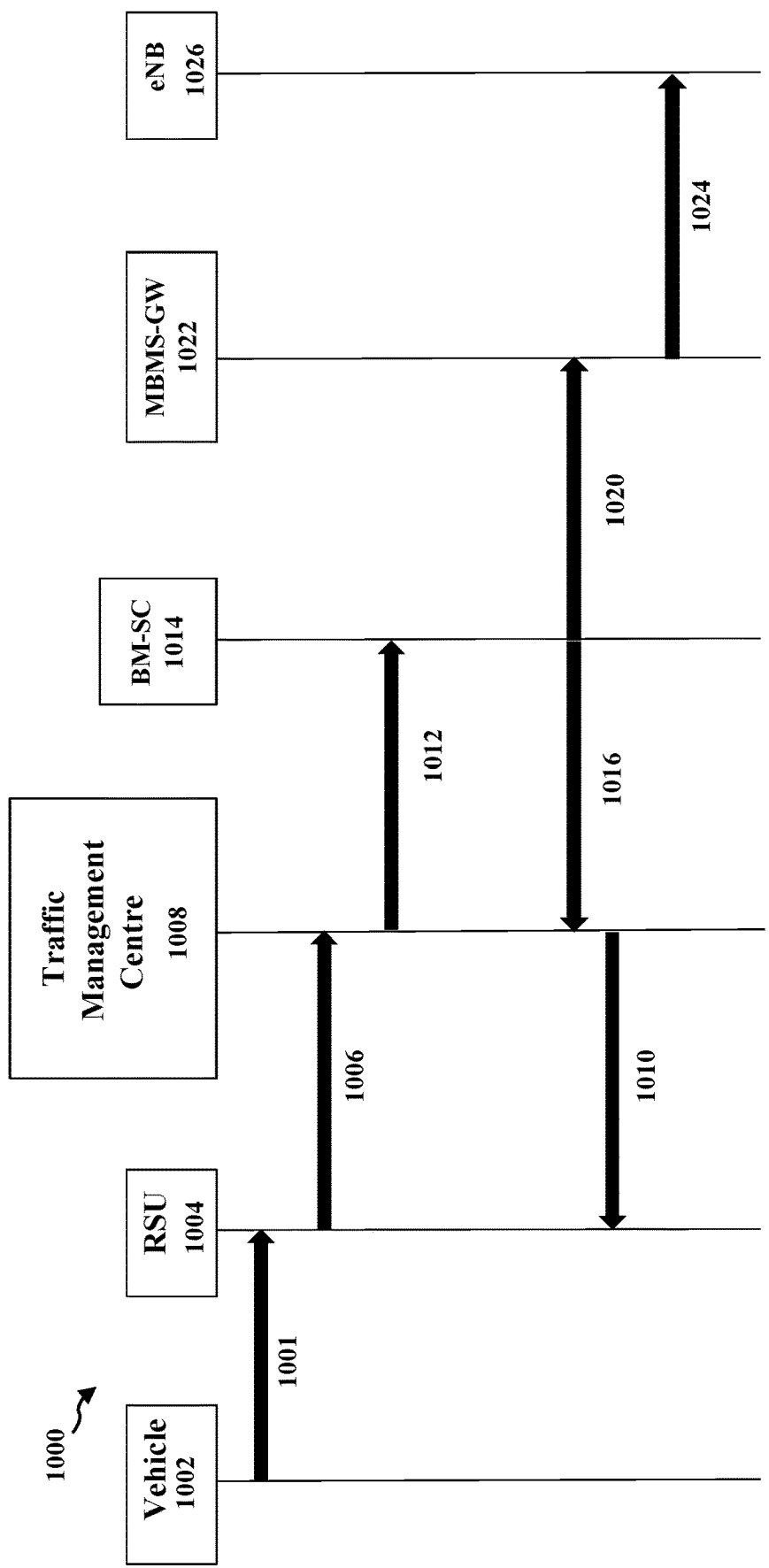
FIG. 10 is a diagram illustrating a message flow related to bootstrapping MBMS from a V2X proximity broadcast in accordance with an example of this disclosure.

FIG. 10 is a diagram 1000 illustrating a message flow related to bootstrapping MBMS from a V2X proximity broadcast. As illustrated in FIG. 10, a first message 1001 may originate from the vehicle 1002. The first message 1001 may be a V2X broadcast. The V2X broadcast may include information regarding an incident. The incident may be, for example, a traffic crash, a broken down vehicle, a traffic jam, or another incident that may impact drivers on the road, for example. The V2X broadcast may include information about the incident such as the incident location, a timestamp or other indication of the time when the incident occurred, path history, or other data related to the incident. In one example, first message 1001 may be transmitted from the vehicle 1002 to the RSU 1004.

The RSU 1004 may transmit a unicast message 1006 to a network entity such as a traffic management center 1008. The unicast message 1006 may be via HTTP and may include an incident report. The incident report may include location, timestamp, path history, as well as other data that may be of interest with respect to the particular incident being reported. Traffic management center 1008 may receive the unicast message 1006. Additionally, traffic management center 1008 may unicast via HTTP a request for the MBMS service 1012 to BM-SC 1014. The BM-SC 1014 may add traffic management center 1008's request to the MBMS scheduler (not shown). The BM-SC 1014 may unicast 1016 via HTTP details of the requested an MBMS service such as TMGI, IP multicast address, frequency, start time, stop time, and any other details that may be needed or desirable. The traffic management center 1008 may then unicast 1010 via HTTP some or all of these details of the MBMS service. The BM-SC 1014 may also unicast 1020 a request for MBMS service, such as a list of eNBs, annotated map, alternative route, incident report, location, timestamp, to name a few. The MBMS-GW 1022 may unicast a request 1024 for MBMS service to eNB 1026. The request 1024 may include TMGI, frequency, IP multicast address, annotated map, alternative route, incident report, location, timestamp, to name a few.

Figure 11:
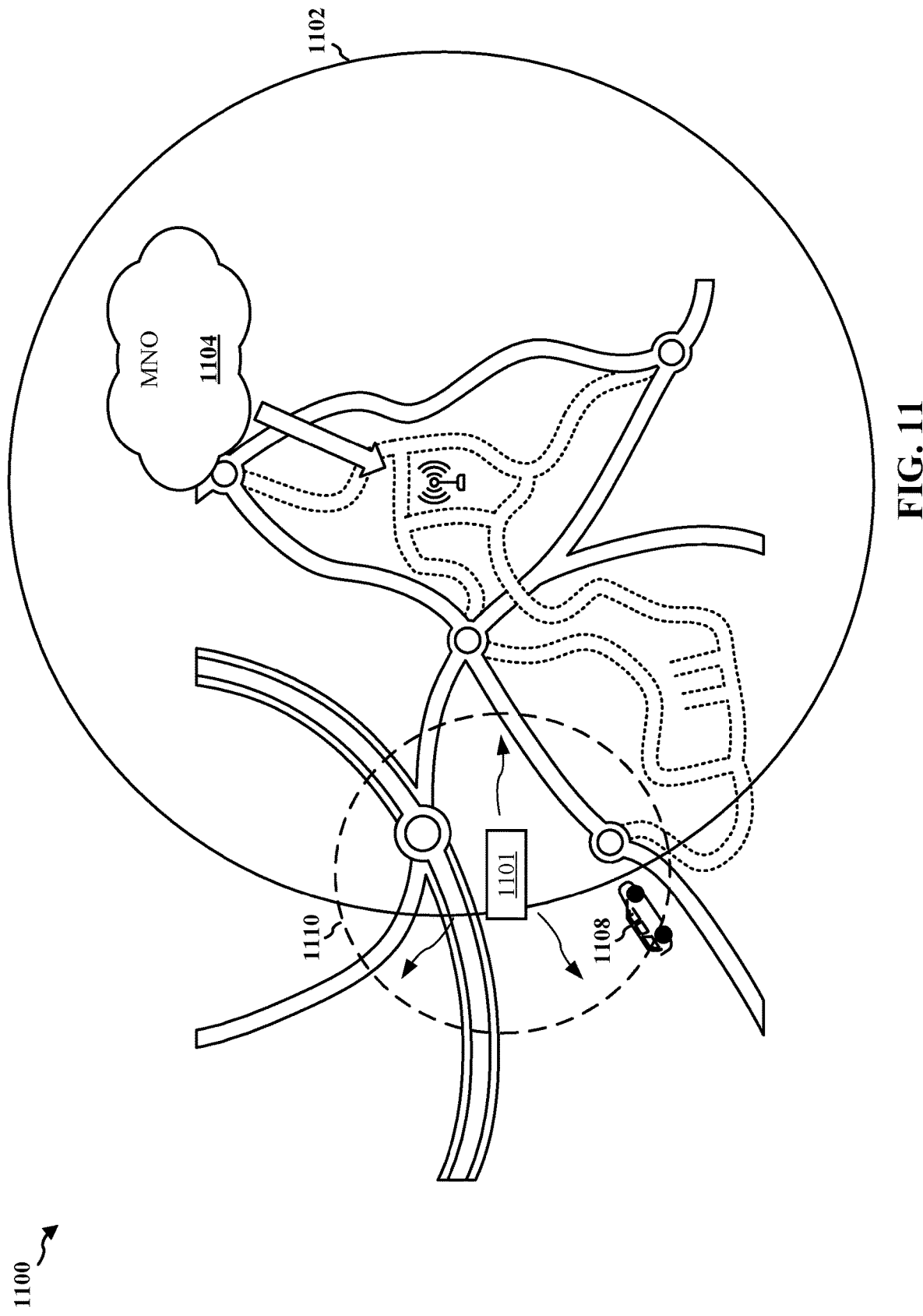
FIG. 11 is a diagram that illustrates a geographic area covered by another communication system in accordance with an example of this disclosure.

FIG. 11 is a diagram illustrating a geographic area 1100 covered by another communication system in accordance with an example of this disclosure. FIG. 11 illustrates another example of bootstrapping MBMS from a V2X proximity broadcast. In the example of FIG. 11 a commercial entity or other entity wishing to advertise or otherwise provide multimedia content to users may communicate with the users using an RSU 1101 and point-to-multipoint broadcasts 1102 such as MBMS broadcast or SC-PTM, to name a few. Advertiser or another entity wishing to provide multimedia content may have an arrangement with an MNO 1104 to distribute multimedia vouchers via point-to-multipoint broadcasts 1102. In some examples, ongoing point-to-multipoint broadcasts 1102 are established in an area.

The RSU 1101 on a site may be controlled by a commercial entity, or another entity may broadcast a V2X message 1110, which contains bootstrapping information for the point-to-multipoint broadcasts 1102.

A passing vehicle 1108 receives V2X message 1110 and may then tune to the point-to-multipoint broadcasts 1102. The passing vehicle 1108 may then download the content of the point-to-multipoint broadcasts 1102 and may also stop at the advertiser's location to potentially make a purchase.

Figure 12:
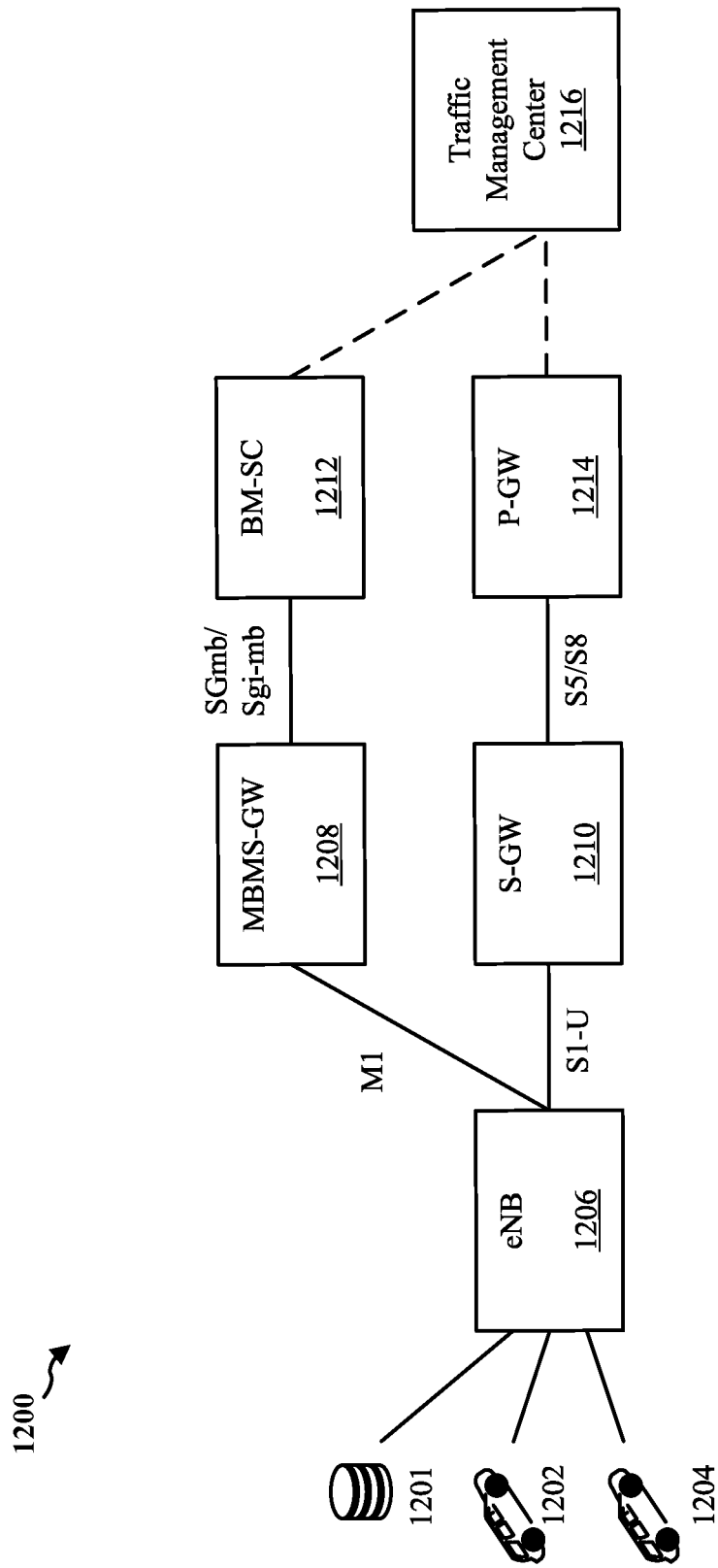
FIG. 12 is a diagram illustrating an example MBMS and LTE architecture that includes an RSU in accordance with an example of this disclosure.

FIG. 12 is a diagram 1200 illustrating an example MBMS and LTE architecture that includes an RSU. The RSU 1201 and the vehicles 1202 and 1204 may communicate with traffic management center 1216 using the architecture illustrated in FIG. 12. The RSU 1201 and vehicles 1202 and 1204 may communicate through the eNB 1206. The eNB 1206 generally acts as a base station for the RSU 1201 and vehicles 1202 and 1204. In the illustrated example, the eNB 1206 is coupled to both MBMS-GW 1208 and serving gateway (S-GW) 1210. The MBMS-GW 1208 generally acts as a base station controlling apparatus while the S-GW 1210 is a gateway and generally routes and forwards data packets between the eNB 1206 and the BM-SC 1212. The MBMS-GW 1208 is coupled to the BM-SC 1212 and generally acts as an upper control to the MBMS-GW 1208.

S-GW 1210 is coupled to a PDN gateway 1214. The PDN gateway 1214 is coupled to traffic management center 1216. Accordingly, the S-GW 1210 and the PDN gateway may route and forward packets between traffic management center 1216 and eNB 1206. BM-SC 1212 is coupled to traffic management center 1216 and generally manages broadcast multicasting.

As described herein, the traffic management center 1216 or some other MNO node may request that a BM-SC to set up a multimedia broadcast session to distribute V2X messages. An eNB may be capable of receiving V2X broadcast transmissions. An MBMS service may be used to distribute V2X messages to a wide audience including RSUs and/or vehicles.

Figure 13:
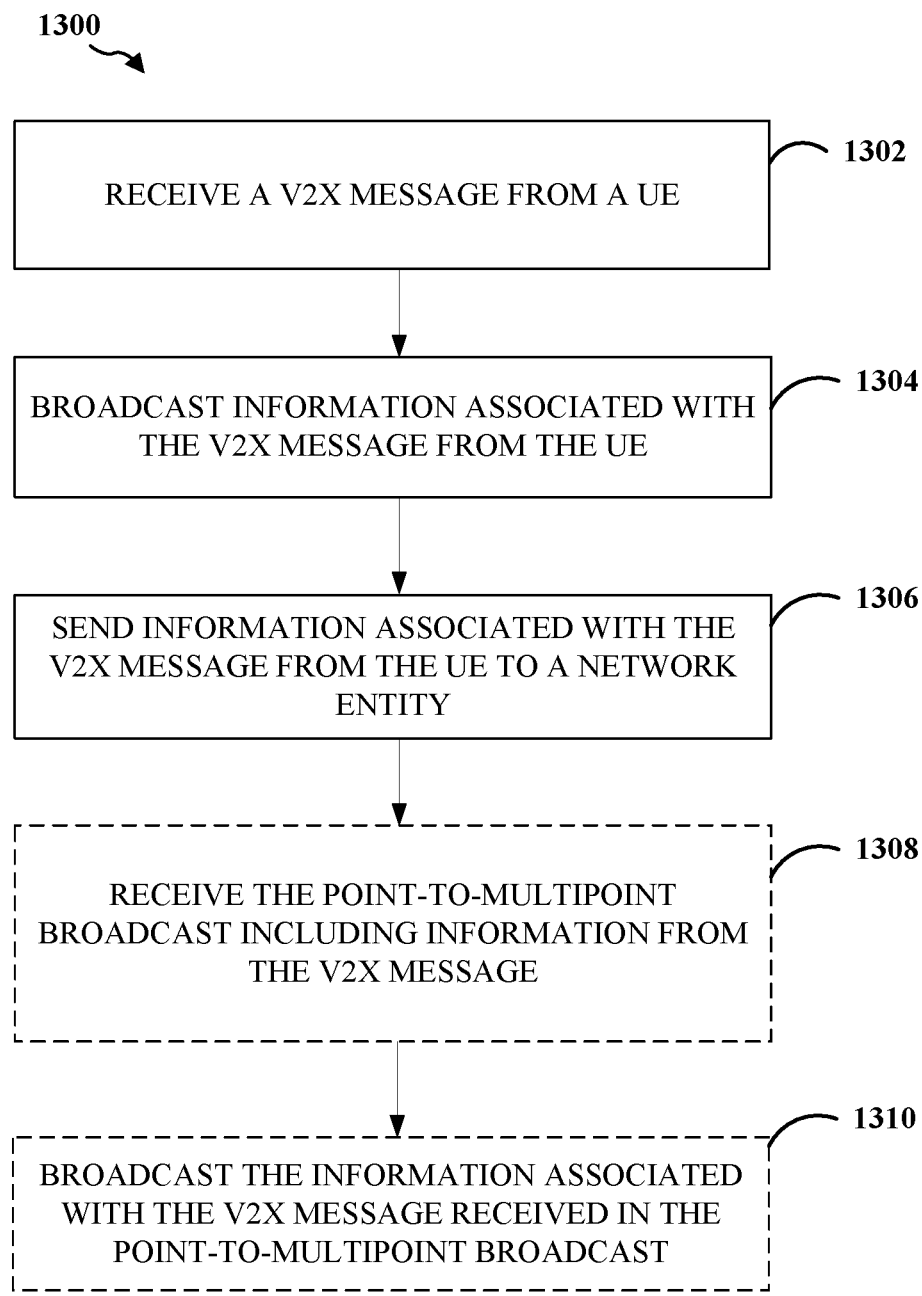
FIG. 13 is a flowchart of a method of wireless communication in accordance with an example of this disclosure.

FIG. 13 is a flowchart 1300 of a method of wireless communication. The method may be performed by an RSU (e.g., the RSU 1201). At 1302, an RSU may receive a V2X message from a UE. For example, referring to FIG. 6, the RSU 601 may receive a V2X message 612 from a UE, e.g., a UE in the vehicle at the incident 602.

At 1304, the RSU may broadcast information associated with the V2X message. For example, referring to FIG. 6, the RSU 601 may broadcast information associated with the V2X message 612 in a V2X message 616. In some examples, the information associated with the V2X message may include incident information, such as information about a crash. Some examples of information related to the details of incident include, but are not limited to, information such as location, severity, or other details that might be useful depending on the type of incident as described herein. The information may be associated with some form of metadata. For example, as discussed above, metadata might be used to set the maximum number of times a relay should occur, e.g., 10 times. Metadata might also be used to set the length of time the information should be considered valid, e.g., 10 minutes or other information pertinent to the incident information.

At 1306, the RSU may send the information associated with the V2X message to a network entity for a point-tomultipoint broadcast. For example, referring to FIG. 6, the RSU 601 may send the information associated with the V2X message 612 to a network entity (e.g., the local traffic agency 608 illustrated in FIG. 6 or the traffic management center 1008 illustrated in FIG. 10) for the point-to-multipoint broadcast 614 of FIG. 6.

At 1308, optionally, the RSU may receive the point-to-multipoint broadcast including the information associated with the V2X message. For example, referring to FIG. 6, the RSU 601 may receive the point-to-multipoint broadcast 614 including the information associated with the V2X message 612. In some examples, the received point-to-multipoint broadcast 614 may be an MBMS broadcast. In other examples, the received point-to-multipoint broadcast 614 is an SC-PTM broadcast.

At 1310, optionally, the RSU may broadcast the information associated with the V2X message received in the point-to-multipoint broadcast. For example, referring to FIG. 6, the RSU 601 may broadcast 616 the information associated with the V2X message 612 received in the point-to-multipoint broadcast 614.

Figure 14:
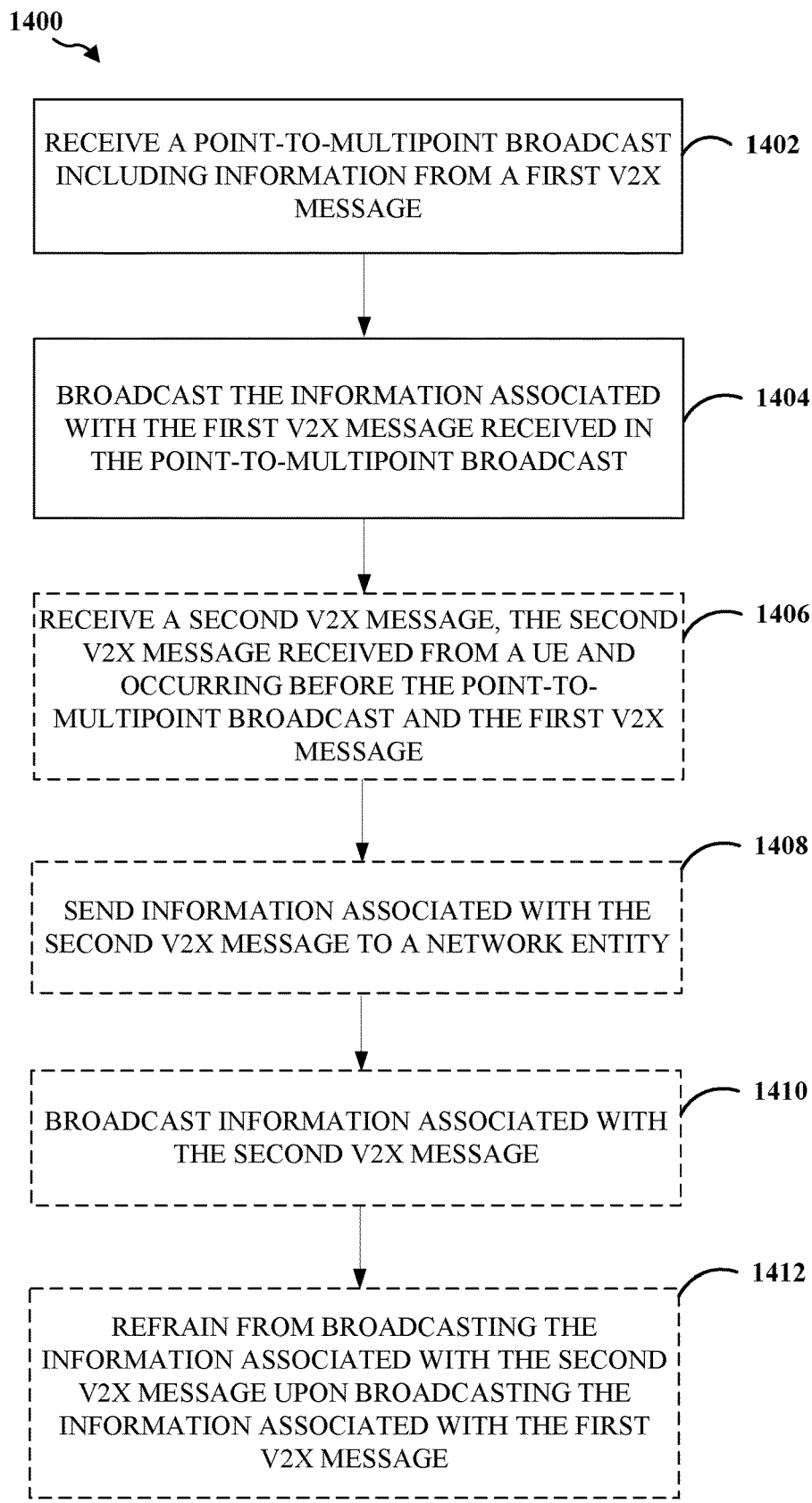
FIG. 14 is another flowchart of a method of wireless communication in accordance with an example of this disclosure.

FIG. 14 is a flowchart 1400 of another method of wireless communication. The method may be performed by the RSU (e.g., the RSU 601). At 1402, an RSU may receive a point-to-multipoint broadcast including information from a first V2X message. For example, referring to FIG. 6, the RSU 601 may receive a point-to-multipoint broadcast 614 including information from a first V2X message (from another RSU 622, 624). In some examples, the point-to-multipoint broadcast 614 may include an MBMS broadcast. In other examples, the point-to-multipoint broadcast may include an SC-PTM broadcast.

At 1404, the RSU may broadcast the information associated with the first V2X message received in the point-to-multipoint broadcast. For example, referring to FIG. 6, the RSU 601 may broadcast the information associated with the first V2X message (from another RSU 622, 624) received in the point-to-multipoint broadcast 614.

At 1406, optionally, the RSU may receive a second V2X message. The second V2X message may be received from a UE and may occur before the point-to-multipoint broadcast and the first V2X message. For example, referring to FIG. 6, the RSU 601 may receive a second V2X message 612. The second V2X message 612 may be received from a UE in the vehicle at the incident 602 and may occur before the point-to-multipoint broadcast 614 and the first V2X message (from another RSU 622, 624).

At 1408, optionally, the RSU may send information associated with the second V2X message to a network entity. For example, referring to FIG. 6, the RSU 601 may send information associated with the second V2X message 612 to a network entity (e.g., the local traffic agency 608). In some examples, the received second V2X message 612 may be associated with the first V2X message (from one of RSUs 622, 624). In some examples, the information associated with the second V2X message 612 is sent to the network entity (e.g., the local traffic agency 608) over a backhaul connection 617. In some examples, the first V2X message (from one of RSUs 622, 624) and the second V2X messages include incident 602 information. In some examples, the first V2X message (from one of RSUs 622, 624) and the second V2X message 612 are identical.

At 1410, optionally, the RSU may broadcast information associated with the second V2X message. For example, referring to FIG. 12, the RSU 1201 may broadcast information associated with the second V2X message 612.

At 1410, optionally, the RSU may refrain from broadcasting the information associated with the second V2X message upon broadcasting the information associated with the first V2X message. For example, referring to FIG. 12, the RSU 1201 may refrain from broadcasting the information associated with the second V2X message 612 upon broadcasting the information associated with the first V2X message (from one of RSUs 622, 624). The information associated with the first V2X message may include the information associated with the second V2X message 612 as well as additional information.

Figure 15:
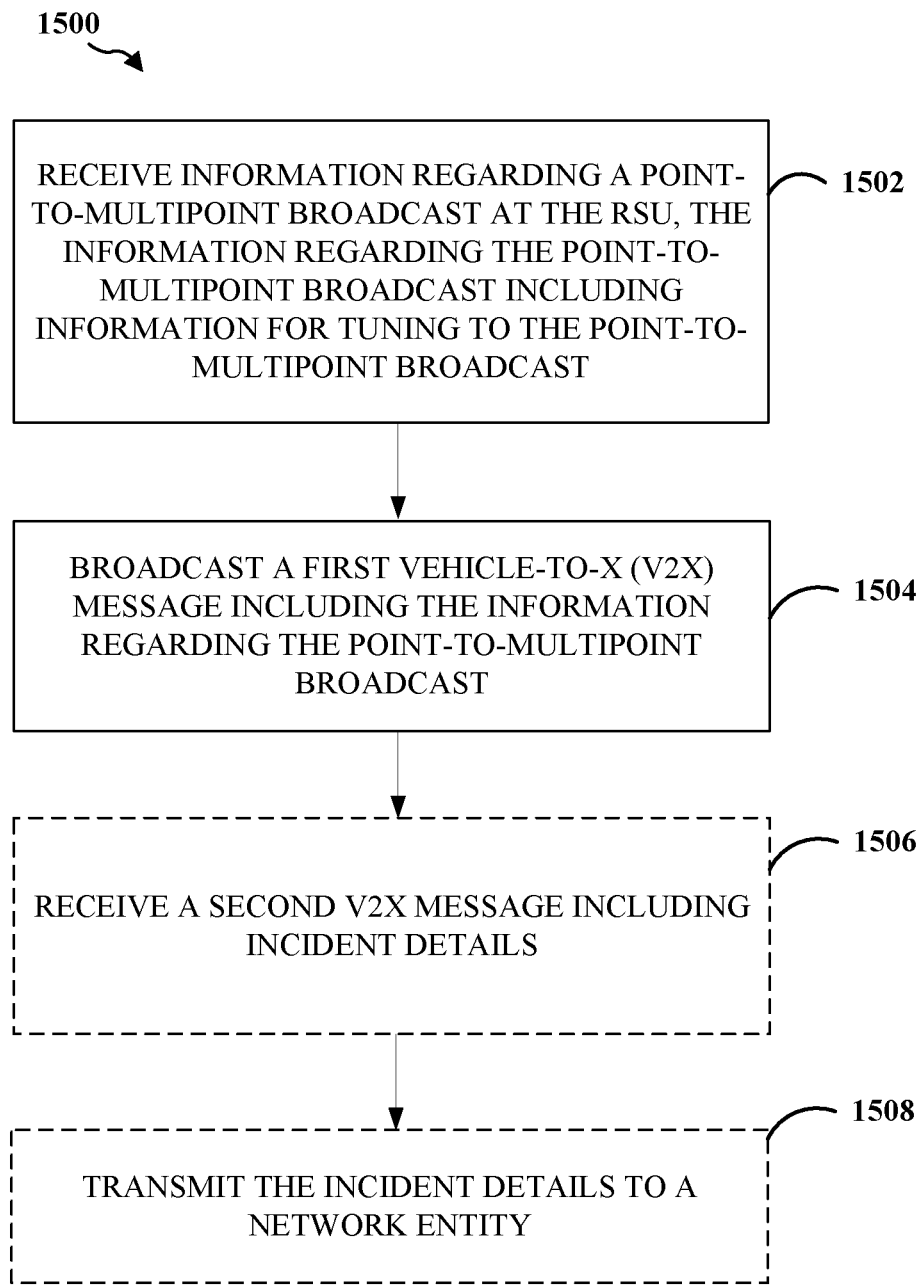
FIG. 15 is another flowchart of a method of wireless communication in accordance with an example of this disclosure.

FIG. 15 is a flowchart 1500 of another method of wireless communication. The method may be performed by the RSU (e.g., the RSU 1201). At 1502, an RSU may receive information regarding a point-to-multipoint broadcast at the RSU. The information regarding the point-to-multipoint broadcast may include information for tuning to the point-to-multipoint broadcast. For example, referring to FIG. 11, the RSU 1101 may receive information regarding a point-to-multipoint broadcast 1102 at the RSU. The information regarding the point-to-multipoint broadcast 1102 may include information for tuning to the point-to-multipoint broadcast 1102. In one example, the point-to-multipoint broadcast 1102 may include an MBMS broadcast. In another example, the point-to-multipoint broadcast 1102 may include an SC-PTM broadcast.

At 1504, the RSU may broadcast a first V2X message including the information regarding the point-to-multipoint broadcast. For example, referring to FIG. 11, the RSU 1101 may broadcast a first V2X message 1110 including the information regarding the point-to-multipoint broadcast. The received information regarding the point-to-multipoint broadcast 1102 may be associated with the transmitted incident details (e.g., incident 602 of FIG. 6). Broadcasting the first V2X message may be in response to receiving the information regarding the point-to-multipoint broadcast 1102. Referring to FIG. 6, in some examples, the point-to-multipoint broadcast 614 may include the incident details transmitted to the network entity (the local traffic agency 608). In some examples, the point-to-multipoint broadcast 614 may include an ongoing point-to-multipoint broadcast including multimedia content.

At 1506, optionally, the RSU may receive a second V2X message including incident details. For example, referring to FIG. 12, the RSU 1201 may transmit the incident details to a network entity.

At 1506, optionally, the RSU may transmit the incident details to a network entity. For example, referring to FIG. 12, the RSU 1201 may transmit the incident details to a network entity. The incident details may be transmitted to the network entity over a backhaul, e.g., backhaul connection 617 of FIG. 6.

Figure 16:
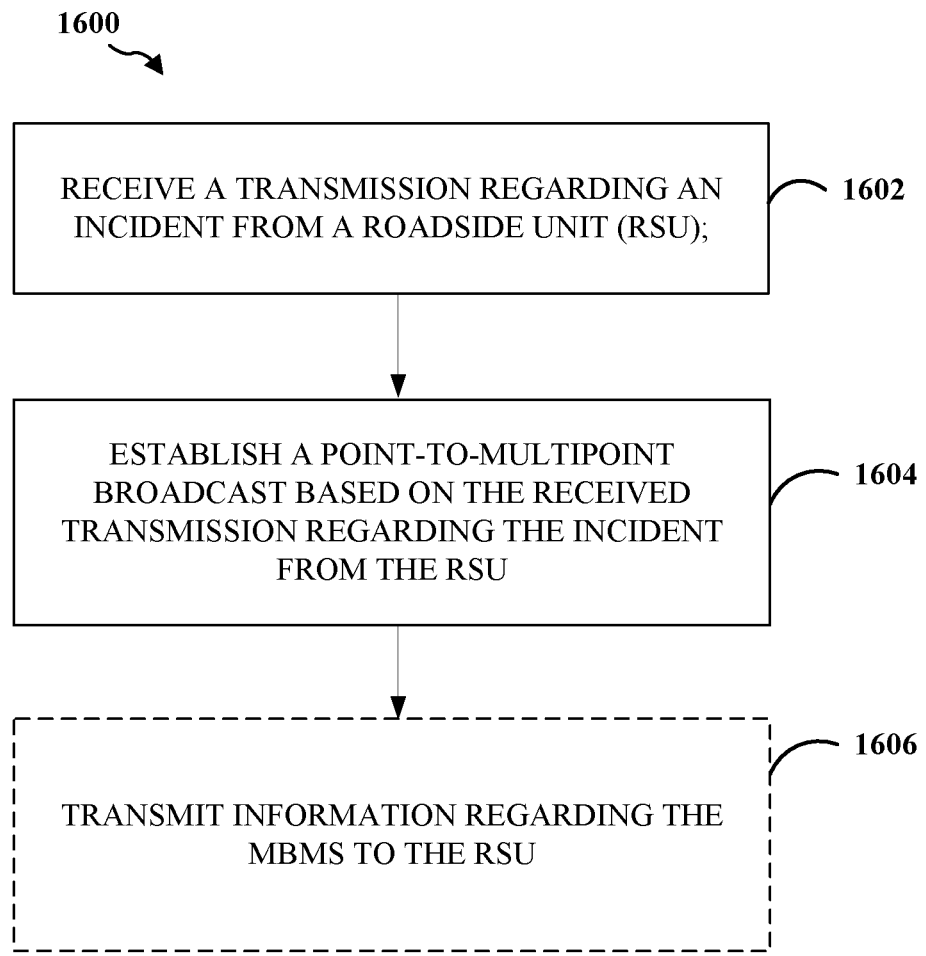
FIG. 16 is another flowchart of a method of wireless communication in accordance with an example of this disclosure.

FIG. 16 is a flowchart 1600 of another method of wireless communication. The method may be performed by a UE installed in a vehicle, RSU, base station, or other electronic communication device. At 1602, an RSU may receive a transmission regarding an incident from another RSU. For example, referring to FIG. 12, the RSU 1201 may receive a transmission regarding an incident from another RSU.

At 1604, the network entity may establish a point-to-multipoint broadcast based on the received transmission regarding the incident from the other RSU. For example, referring to FIG. 12, the network entity may establish a point-to-multipoint broadcast (e.g., the point-to-multipoint broadcast 1102 of FIG. 11) based on the received transmission 1110 regarding the incident from the RSU 1101 of FIG. 11.

At 1606, optionally, an RSU may transmit information regarding the MBMS broadcast to the other RSU. The information regarding the MBMS broadcast may include information for tuning to the MBMS broadcast. For example, referring to FIG. 12, the RSU 1201 may transmit information regarding the MBMS broadcast to the other RSU. The information regarding the MBMS broadcast may include information for tuning to the MBMS broadcast.

Figure 17:
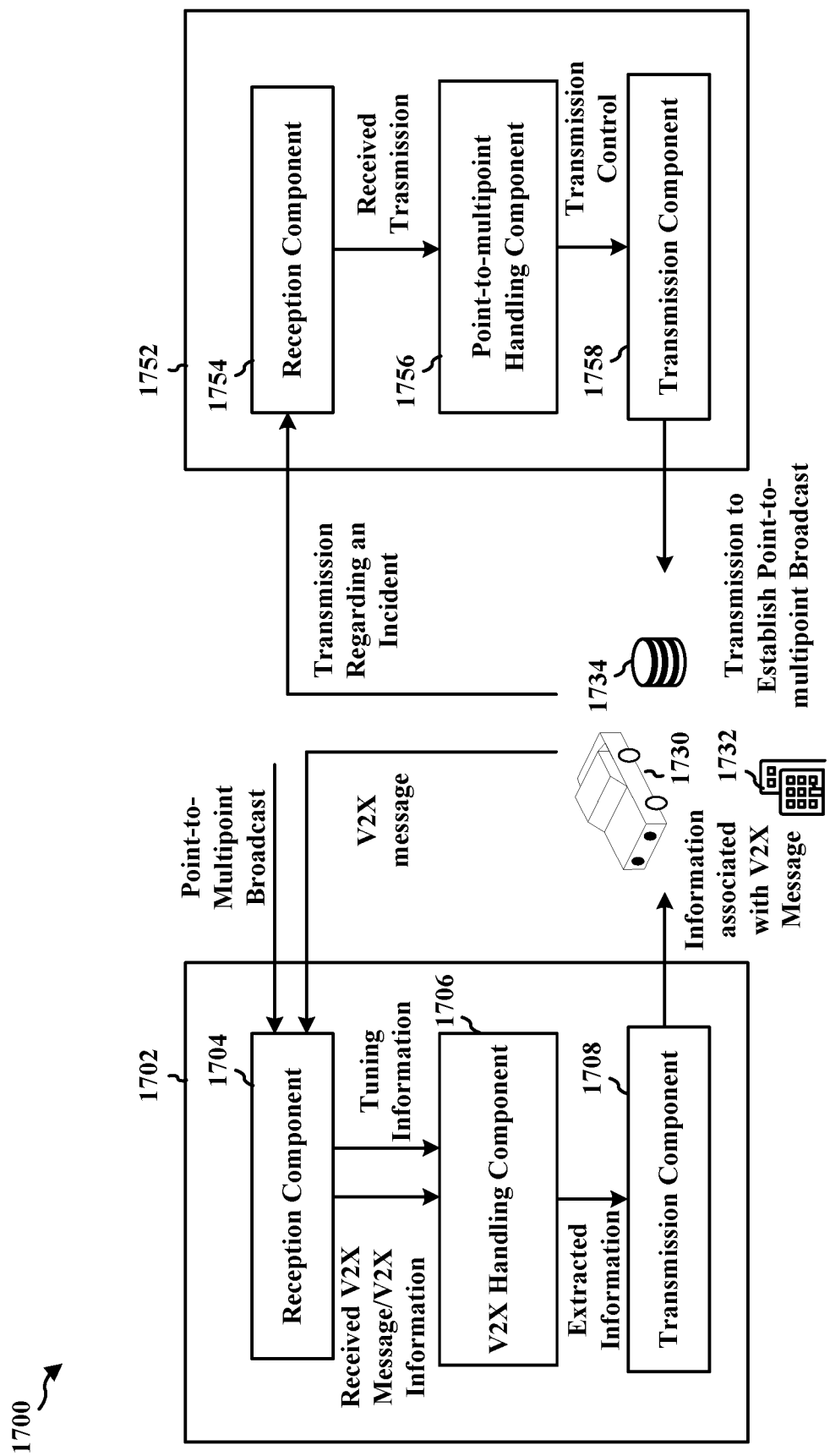
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702 and an exemplary apparatus 1752. The apparatus 1702 may be an RSU, such as the RSU 601 of FIG. 6. The apparatus 1752 may be a network entity, such as the local traffic agency 608 of FIG. 6. The apparatus 1702 includes a reception component 1704 that is configured to receive a V2X message from a UE. The apparatus further includes a V2X handling component 1706 that is configured to process the received V2X message to extract information associated with the V2X message. The apparatus 1702 further includes a transmission component 1708 that is configured to broadcast information associated with the V2X message and send the information associated with the V2X message to a network entity for a point-to-multipoint broadcast.

In one configuration, the reception component 1704 may be configured to receive a point-to-multipoint broadcast including the information associated with the V2X message. The transmission component 1708 may be configured to broadcast the information associated with the V2X message received in the point-to-multipoint broadcast. In one configuration, the point-to-multipoint broadcast may be an MBMS broadcast. In one configuration, the point-to-multipoint broadcast may be an SC-PTM broadcast. The V2X message may include bootstrapping information to tune to an MBMS broadcast.

In one configuration, the reception component 1704 may be configured to receive a point-to-multipoint broadcast including information from a first V2X message. The V2X handling component 1706 process the point-to-multipoint broadcast to extract the information associated with the first V2X message. The transmission component 1708 may be configured to broadcast the information associated with the first V2X message received in the point-to-multipoint broadcast. In one configuration, the point-to-multipoint broadcast may be an MBMS broadcast. In one configuration, the point-to-multipoint broadcast may be an SC-PTM broadcast.

In one configuration, the reception component 1704 may be configured to receive a second V2X message. The second V2X message may be received from a UE and may occur before the point-to-multipoint broadcast and the first V2X message. The transmission component 1708 may be configured to send information associated with the second V2X message to a network entity 1732. The received second V2X message may be associated with the first V2X message.

In one configuration, the reception component 1704 may be configured to broadcast information associated with the second V2X message or refrain from broadcasting the information associated with the second V2X message upon broadcasting the information associated with the first V2X message. The information associated with the second V2X message may be sent to the network entity over a backhaul. The first V2X message and the second V2X messages may include incident information. The first V2X message and the second V2X message may be identical. The first V2X message may include the second V2X message and information associated with a third V2X message. The V2X message may include bootstrapping information to tune to an MBMS broadcast.

In one configuration, the reception component 1704 may be configured to receive information regarding a point-to-multipoint broadcast at the RSU. The information regarding the point-to-multipoint broadcast includes information for tuning to the point-to-multipoint broadcast. The V2X handling component 1706 may receive and process the information for tuning to the point-to-multipoint broadcast. The V2X handling component 1706 may pass the tuning information to the transmission component 1708. The transmission component 1708 may be configured to broadcast a first V2X message including the information regarding the point-to-multipoint broadcast. The point-to-multipoint broadcast may be an MBMS broadcast. The point-to-multipoint broadcast may be an SC-PTM broadcast.

In one configuration, the reception component may be configured to receive a second V2X message including incident details. The transmission component may be configured to transmit the incident details to a network entity. The received information regarding the point-to-multipoint broadcast may be associated with the transmitted incident details. The incident details may be transmitted to the network entity over a backhaul. Broadcasting the first V2X message may be in response to receiving the information regarding the point-to-multipoint broadcast. The point-to-multipoint broadcast may include the incident details transmitted to the network entity. The point-to-multipoint broadcast may include an ongoing point-to-multipoint broadcast including multimedia content.

In one configuration, the apparatus 1752 includes a reception component 1754 configured to receiving a transmission regarding an incident from an RSU 1734. The apparatus 1752 further includes a point-to-multipoint handling component 1756 configured to establish a point-to-multipoint broadcast based on the received transmission regarding the incident from the RSU. The point-to-multipoint handling component 1756 may be further configured to control a transmission component 1758 configured to transmit signals to establish the point-to-multipoint broadcast. The point-to-multipoint broadcast may include an MBMS broadcast. The point-to-multipoint broadcast may include an SC-PTM broadcast.

In one configuration, the transmission component may further be configured to transmit information regarding the MBMS broadcast to the RSU. The information regarding the MBMS broadcast may include information for tuning to the MBMS broadcast. The information regarding the MBMS broadcast may be transmitted to the RSU over a backhaul.

The apparatuses 1702, 1752 may include additional components that perform each of the blocks of the algorithm in the aforementioned flowcharts of FIGS. 13-16. As such, each block in the aforementioned flowcharts of FIGS. 13-16 may be performed by a component and the apparatuses 1702, 1752 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
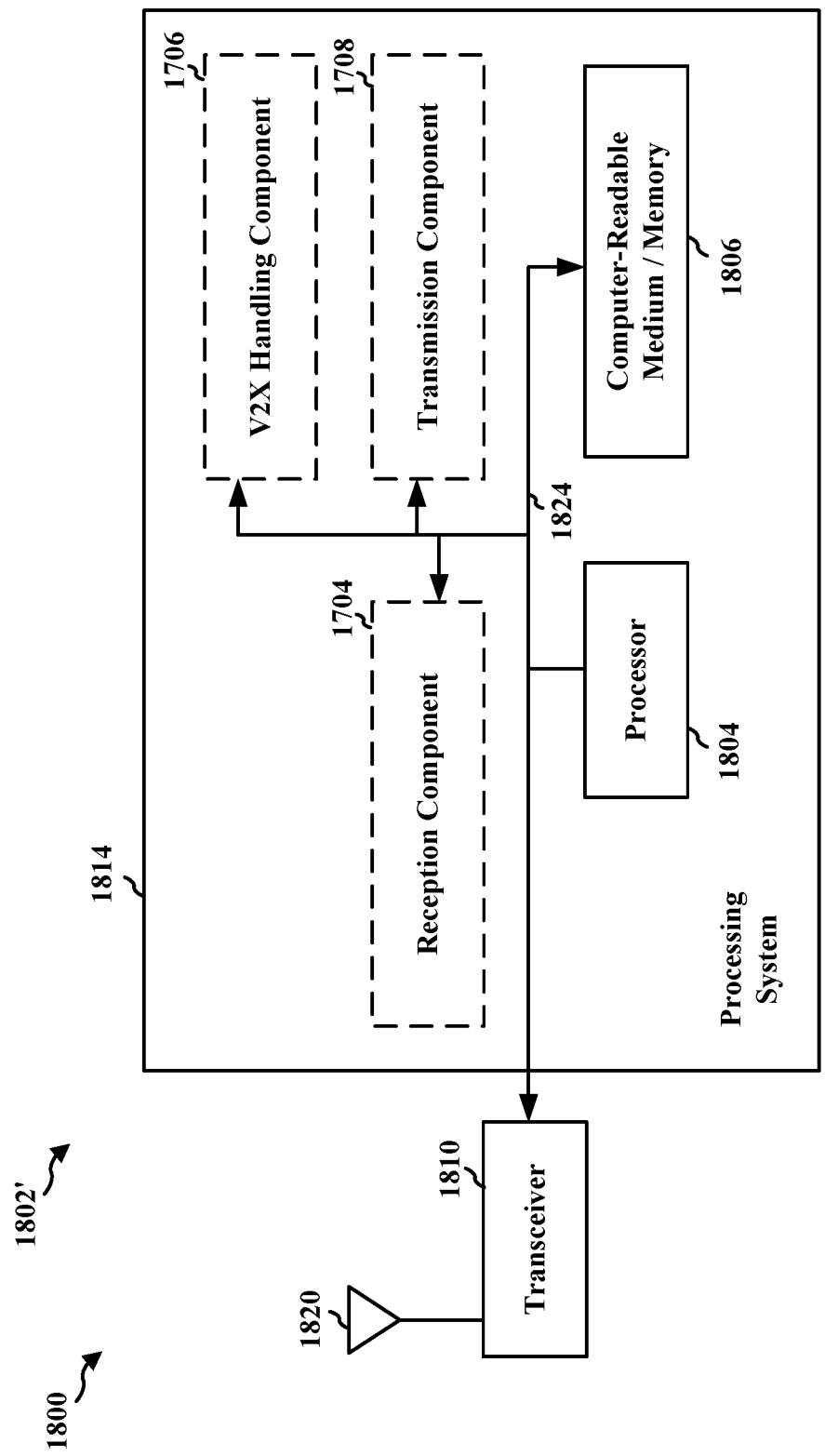
FIG. 18 is a diagram illustrating an example of a hardware implementation for an apparatus employing a processing system.

FIG. 18 is a diagram 1800 illustrating an example of a hardware implementation for an apparatus 1802' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704 of FIG. 17. In addition, the transceiver 1810 receives information from the processing system 1814, specifically the transmission component 1708 of FIG. 17, and based on the received information, generates a signal to be applied to the one or more antennas 1820. The processing system 1814 includes the processor 1804 coupled to the computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes, at least, one of the components 1704, 1706, 1708. The components may be software components running in the processor 1804, resident/stored in the computer-readable medium/memory 1806, one or more hardware components coupled to the processor 1804, or some combination thereof. The processing system 1814 may be a component of the UE 350 and may include the memory 360 and/or at least, one of the TX processor 368, the RX processor 356, and the controller/processor 359.

In one configuration, the apparatus 1802' for wireless communication may be an RSU. In one configuration, the RSU may include means for receiving a V2X message from a UE. The RSU may further include means for broadcasting information associated with the V2X message. The RSU may further include means for sending the information associated with the V2X message to a network entity for point-to-multipoint broadcast.

In one configuration, the RSU may further include means for receiving a point-to-multipoint broadcast including the information associated with the V2X message. In addition, the RSU may further include means for broadcasting the information associated with the V2X message received in the point-to-multipoint broadcast.

In one configuration, the received point-to-multipoint broadcast is an MBMS broadcast. In one configuration, the received point-to-multipoint broadcast is an SC-PTM broadcast.

In another configuration, the RSU may include means for receiving a point-to-multipoint broadcast including information from a first V2X message. The RSU further includes means for broadcasting the information associated with the first V2X message received in the point-to-multipoint broadcast.

In one configuration, the point-to-multipoint broadcast may include an MBMS broadcast. In one configuration, the point-to-multipoint broadcast may include an SC-PTM broadcast.

In one configuration, the RSU may further include means for receiving a second V2X message. The second V2X message may be received from a UE and may occur before the point-to-multipoint broadcast and the first V2X message. In addition, the RSU may further include means for sending information associated with the second V2X message to a network entity. In one configuration, the received second V2X message may be associated with the first V2X message.

In one configuration, the RSU may further include means for broadcasting information associated with the second V2X message. In addition, the RSU may further include means for refraining from broadcasting the information associated with the second V2X message upon broadcasting the information associated with the first V2X message.

In one configuration, the information associated with the second V2X message is sent to the network entity over a backhaul. In one configuration, the first V2X message and the second V2X messages include incident information. In one configuration, the first V2X message and the second V2X message are identical. In one configuration, the first V2X message includes the second V2X message and information associated with a third V2X message.

In one configuration, the RSU may further include means for receiving information regarding a point-to-multipoint broadcast at the RSU. The information regarding the point-to-multipoint broadcast may include information for tuning to the point-to-multipoint broadcast. The RSU further includes means for broadcasting a first V2X message including the information regarding the point-to-multipoint broadcast.

In one configuration, the point-to-multipoint broadcast may include an MBMS broadcast. In one configuration, the point-to-multipoint broadcast may include an SC-PTM broadcast.

In one configuration, the RSU may further include means for receiving a second V2X message including incident details. In addition, the RSU may further include means for transmitting the incident details to a network entity. In one configuration, the received information regarding the point-to-multipoint broadcast is associated with the transmitted incident details.

In one configuration, the incident details are transmitted to the network entity over a backhaul. In one configuration, broadcasting the first V2X message is in response to receiving the information regarding the point-to-multipoint broadcast. In one configuration, the point-to-multipoint broadcast includes the incident details transmitted to the network entity. In one configuration, the point-to-multipoint broadcast may include an ongoing point-to-multipoint broadcast including multimedia content.

Figure 19:
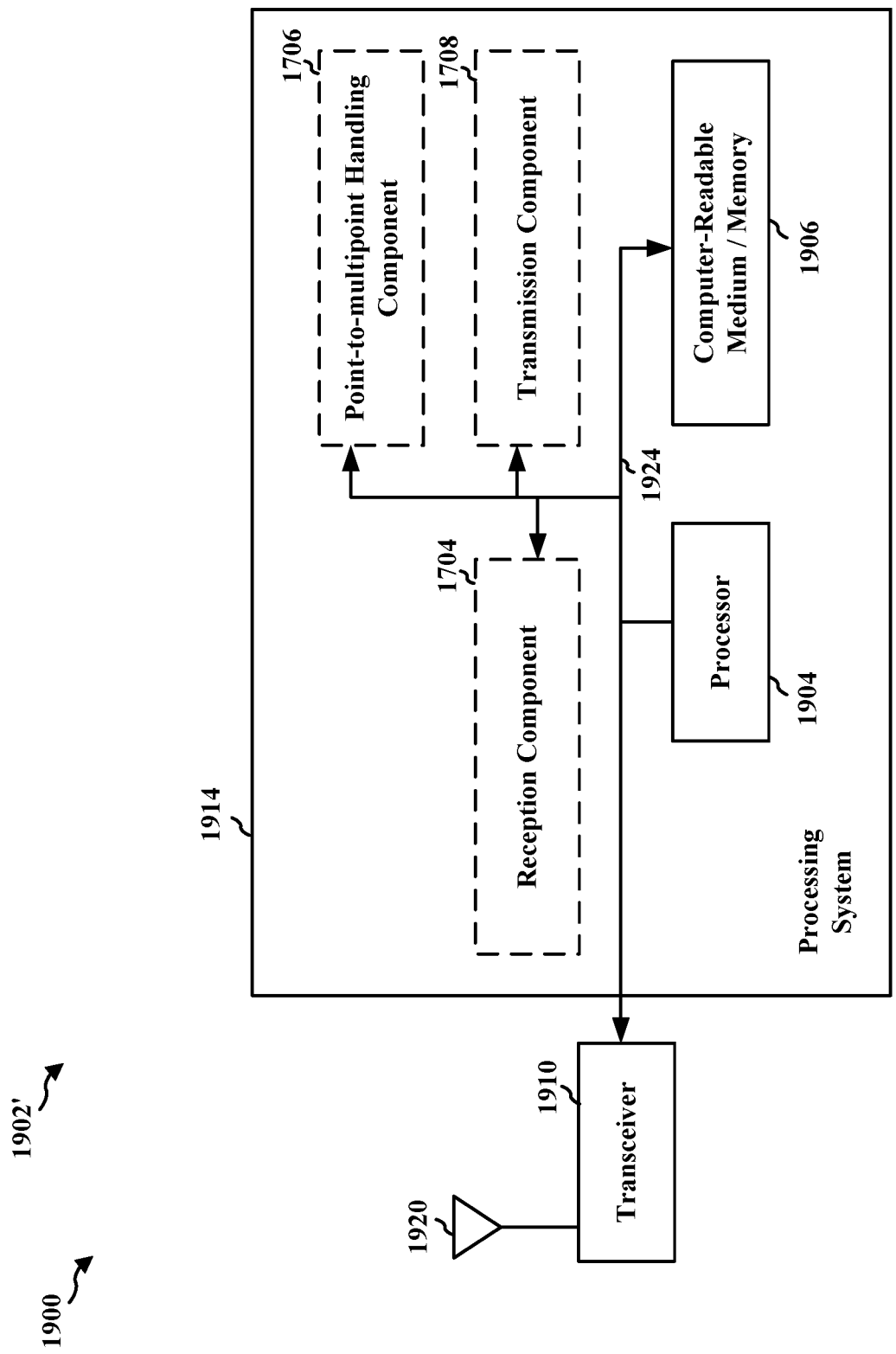
FIG. 19 is another diagram illustrating an example of a hardware implementation for an apparatus employing a processing system.

FIG. 19 is another diagram 1900 illustrating an example of a hardware implementation for an apparatus 1902' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1754, 1756, 1758, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1754 of FIG. 17. In addition, the transceiver 1910 receives information from the processing system 1914, specifically the transmission component 1758 of FIG. 17, and based on the received information, generates a signal to be applied to the one or more antennas 1920. The processing system 1914 includes the processor 1904 coupled to the computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes, at least, one of the components 1754, 1756, 1758. The components may be software components running in the processor 1904, resident/stored in the computer-readable medium/memory 1906, one or more hardware components coupled to the processor 1904, or some combination thereof. The processing system 1914 may be a component of the eNB 310 and may include the memory 376 and/or at least, one of the TX processor 316, the RX processor 370, and the controller/processor 375.

In one configuration, a network entity includes means for receiving a transmission regarding an incident from an RSU. The network entity further includes means for establishing a point-to-multipoint broadcast based on the received transmission regarding the incident from the RSU.

In one configuration, the point-to-multipoint broadcast may include an MBMS broadcast. In one configuration, the point-to-multipoint broadcast may include an SC-PTM broadcast.

In one configuration, the RSU may further include means for transmitting information regarding the MBMS broadcast to the RSU, the information regarding the MBMS broadcast including information for tuning to the MBMS broadcast.

In one configuration, the information regarding the MBMS broadcast is transmitted to the RSU over a backhaul.

The aforementioned means may be one or more of the aforementioned components of the apparatus 1902' and/or the processing system 1914 of the apparatus 1902' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The aforementioned means may be one or more of the aforementioned components of the apparatus 1302 and/or the processing system 1914 of the apparatus 1302' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of a roadside unit (RSU), comprising:
   receiving a vehicle-to-X (V2X) message from a user equipment (UE);
   broadcasting, in a separate V2X message, information associated with the V2X message received from the UE, wherein the separate V2X message includes bootstrapping information to tune to a multimedia broadcast multicast service (MBMS) broadcast; and
   sending, in a separate transmission over a backhaul connection, the information associated with the V2X message to a network entity for a point-to-multipoint broadcast.

2. The method of claim 1, further comprising:
receiving a point-to-multipoint broadcast including the information associated with the V2X message; and
broadcasting the information associated with the V2X message received in the point-to-multipoint broadcast.

3. The method of claim 2, wherein the point-to-multipoint broadcast is a multimedia broadcast multicast service (MBMS) broadcast.

4. The method of claim 2, wherein the point-to-multipoint broadcast is a single cell point-to-multipoint (SC-PTM) broadcast.

5. The method of claim 1, wherein sending the information associated with the V2X message to the network entity comprises sending the information associated with the V2X message directly to the network entity.

6. An apparatus for wireless communication, the apparatus being a roadside unit (RSU), comprising:
a memory; and
at least one processor coupled to the memory and configured to:
receive a vehicle-to-X (V2X) message from a user equipment (UE);
broadcast, in a separate V2X message, information associated with the V2X message received from the UE, wherein the separate V2X message includes bootstrapping information to tune to a multimedia broadcast multicast service (MBMS) broadcast; and
send, in a separate transmission over a backhaul connection, the information associated with the V2X message to a network entity for point-to-multipoint broadcast.

7. The apparatus of claim 6, wherein the at least one processor is further configured to:
receive a point-to-multipoint broadcast including the information associated with the V2X message; and
broadcast the information associated with the V2X message received in the point-to-multipoint broadcast.

8. The apparatus of claim 7, wherein the point-to-multipoint broadcast is a multimedia broadcast multicast service (MBMS) broadcast.

9. The apparatus of claim 7, wherein the point-to-multipoint broadcast is a single cell point-to-multipoint (SC-PTM) broadcast.

* * * * *